United States Patent [19]

Millett et al.

[11] Patent Number: 4,817,036

[45] Date of Patent: Mar. 28, 1989

[54] COMPUTER SYSTEM AND METHOD FOR DATA BASE INDEXING AND INFORMATION RETRIEVAL

[75] Inventors: Ronald P. Millett; Howard L. Millett; Dell K. Allen, all of Orem, Utah

[73] Assignee: Brigham Young University, Provo, Utah

[21] Appl. No.: 712,546

[22] Filed: Mar. 15, 1985

[51] Int. Cl.$^4$ ............................................. G06F 15/40
[52] U.S. Cl. ................................................. 364/900
[58] Field of Search ... 364/900, 200, 300, 900 MS File, 364/200 MS File

[56] References Cited

U.S. PATENT DOCUMENTS

| | | | |
|---|---|---|---|
| 3,388,381 | 6/1968 | Prywess et al. | 340/172.5 |
| 3,643,226 | 2/1972 | Loizides et al. | 340/172.5 |
| 3,670,310 | 6/1972 | Bharwani et al. | 340/172.5 |
| 3,678,461 | 7/1972 | Choate et al. | 340/172.5 |
| 3,678,470 | 7/1972 | Choate et al. | 340/172.5 |
| 3,699,531 | 10/1972 | Hiemann | 340/172.5 |
| 3,716,840 | 2/1973 | Masten et al. | 340/172.5 |
| 3,725,875 | 4/1973 | Choate et al. | 340/172.5 |
| 3,737,864 | 6/1973 | Werner | 340/172.5 |
| 3,916,387 | 10/1975 | Woodrum | 340/172.5 |
| 4,056,711 | 11/1977 | Lamar | 364/200 |
| 4,068,224 | 1/1978 | Bechtle et al. | 340/324 |
| 4,068,298 | 1/1978 | Dechant et al. | 364/200 |
| 4,068,301 | 1/1978 | Ishino et al. | 364/200 |
| 4,068,303 | 1/1978 | Morita | 364/200 |
| 4,074,235 | 2/1978 | Thomas | 364/900 |
| 4,085,446 | 4/1978 | Nagamura | 364/900 |
| 4,086,628 | 4/1978 | Woodrum | 364/200 |
| 4,318,184 | 3/1982 | Millett et al. | 364/900 |
| 4,384,342 | 5/1983 | Imura et al. | 364/900 |
| 4,384,343 | 5/1988 | Morganti et al. | 364/900 |
| 4,403,300 | 9/1983 | Bavoux et al. | 364/900 |
| 4,408,301 | 10/1983 | Iida | 364/900 |
| 4,410,960 | 10/1983 | Kasuya | 364/900 |
| 4,414,644 | 11/1983 | Tayler | 364/900 |
| 4,417,321 | 11/1983 | Chang et al. | 364/900 |
| 4,422,158 | 12/1983 | Galie | 364/900 |
| 4,468,728 | 8/1984 | Wang | 364/200 |
| 4,554,631 | 11/1985 | Reddington | 364/300 |

OTHER PUBLICATIONS

"Automated Manufacturing Planning", Russell H. Reals, American Society of Mechanical Engineers Conf., May 9-12, 1966.
"An Analytical Technique for the Selection of Manufacturing Operation", Benj. W. Niebel, The Journal of Industrial Eng., vol. XVII, No. II (1966).
"Autopros Automated Process Planning Sys.", Chr. Kjargaard Nissen, CIRP International Conf., Sep. 11th-13th, (1969).
CCMS; Guide Computer-Controlled Microform Search System, Revised 8-1978, U.S. Dept. of Commerce.
Computer Data Base Organization, James Martin (1975).

Primary Examiner—Gareth D. Shaw
Assistant Examiner—Paul Kulik
Attorney, Agent, or Firm—Workman, Nydegger, Jensen

[57] ABSTRACT

A computer system and method for data base indexing and information retrieval. A number of keywords are selected and each record of a data base is searched to determine in which records each keyword appears. The central processing unit of the system then creates a vector for each keyword which identifies each record number of the data base where the keyword appears and numerically sorts the record numbers. A special bit processor next transforms each vector into a bit string that is identified by one of the keywords. The bit strings are returned to the central processing unit and are stored in secondary storage so as to form an index for the data base. To retrieve information, one or more keywords are input to the central processing unit. The input keywords are used by the central processing unit to identify the bit string for each keyword. The keywords may be logically joined using "AND," "OR" and/or "NOT" commands. Each bit string retrieved from the index is then sent to the special purpose bit processor, which combines the bit strings according to the particular command. The resultant bit string is transformed by the bit processor into a vector which is returned to the central processing unit and which then is used to identify the individual records which contain the combined keywords.

38 Claims, 22 Drawing Sheets (VECTOR → BIT)

("AND")

("AND")

("AND")

("AND")

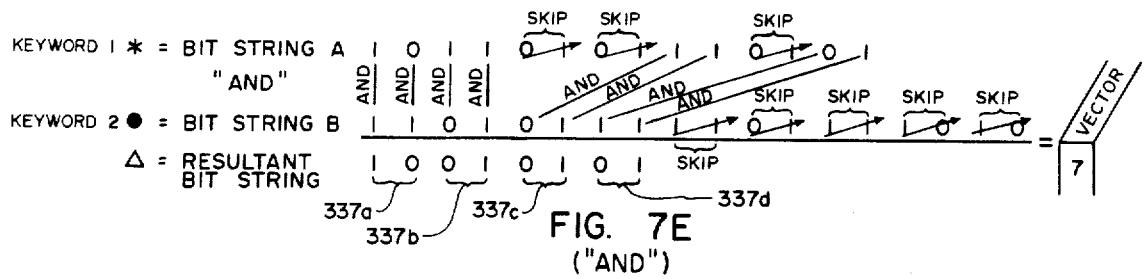
FIG. 7E ("AND")
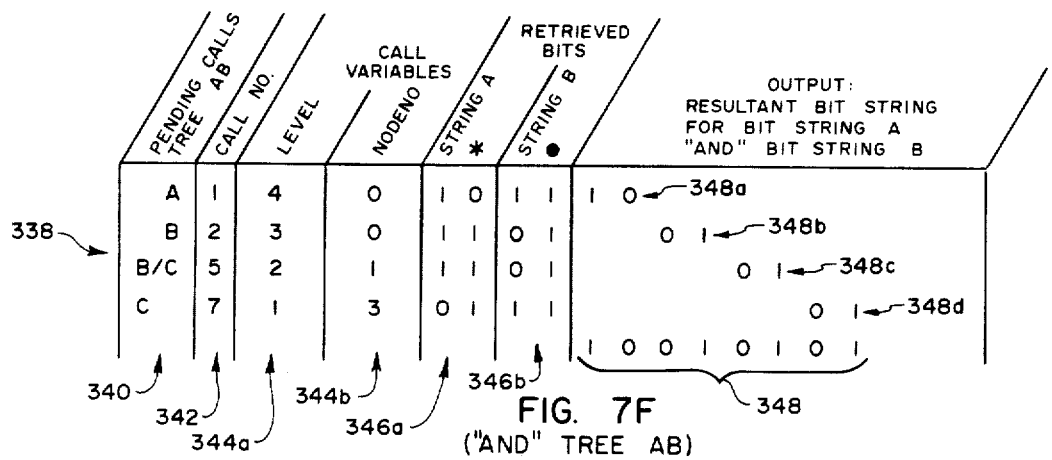
FIG. 7F ("AND" TREE AB)
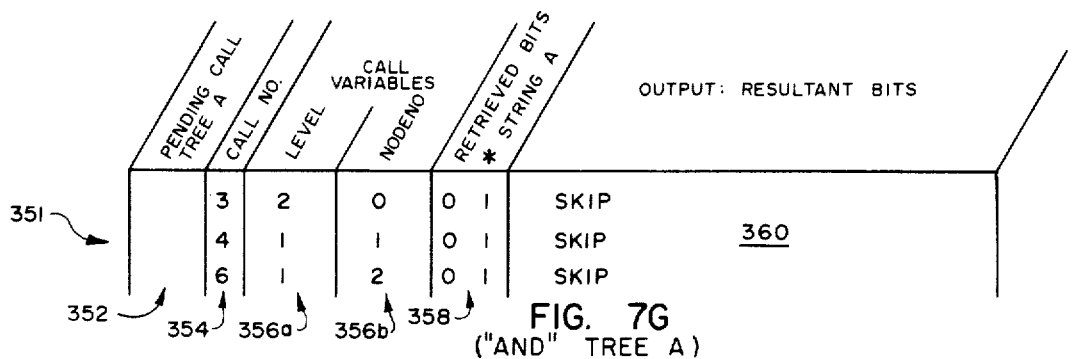
FIG. 7G ("AND" TREE A)
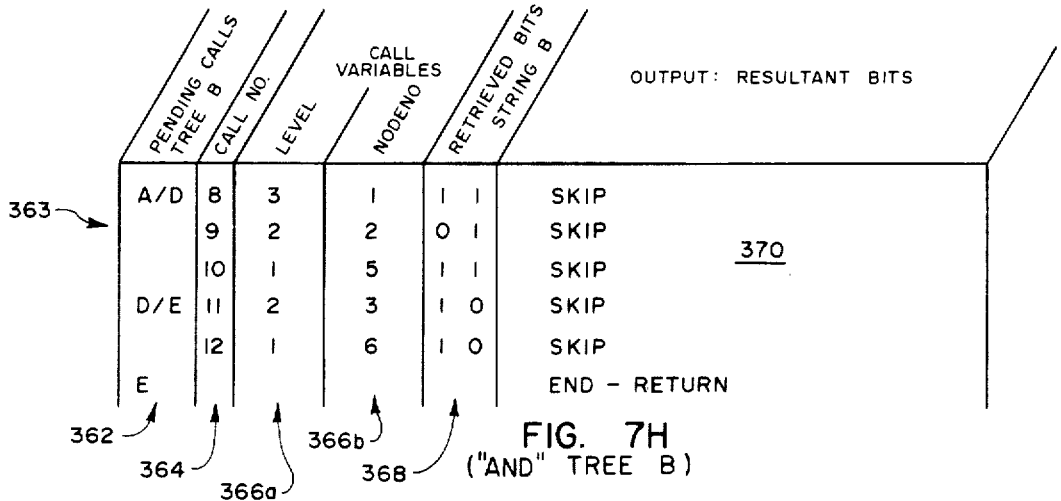
FIG. 7H ("AND" TREE B)

("OR")

("OR")

("OR")

("OR")

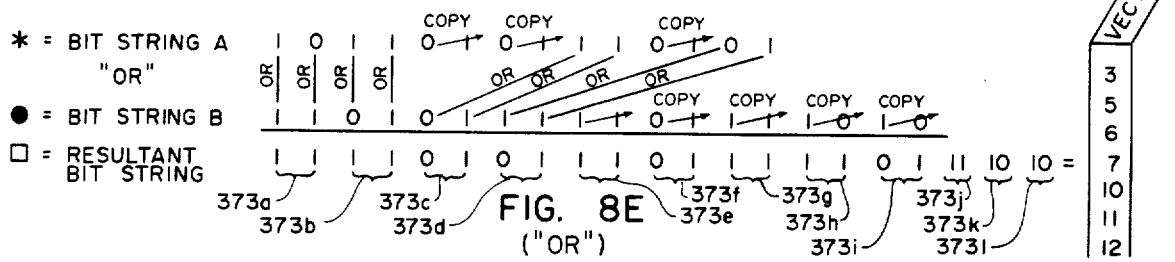
FIG. 8E ("OR")
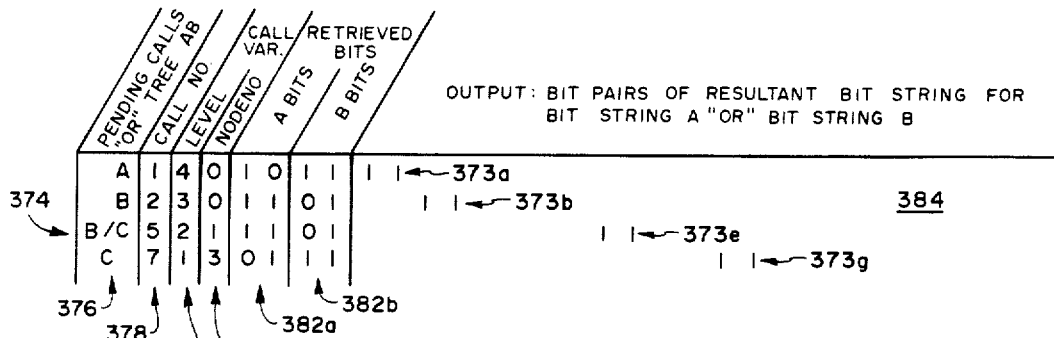
FIG. 8F ("OR" TREE AB)
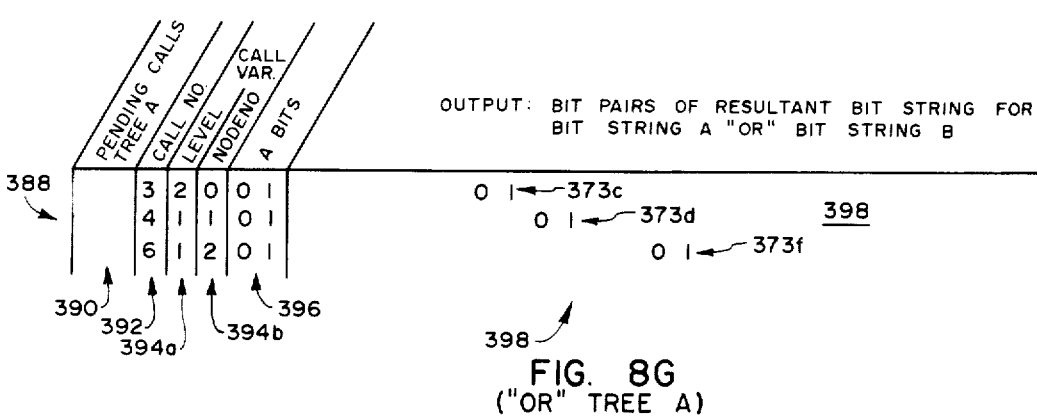
FIG. 8G ("OR" TREE A)
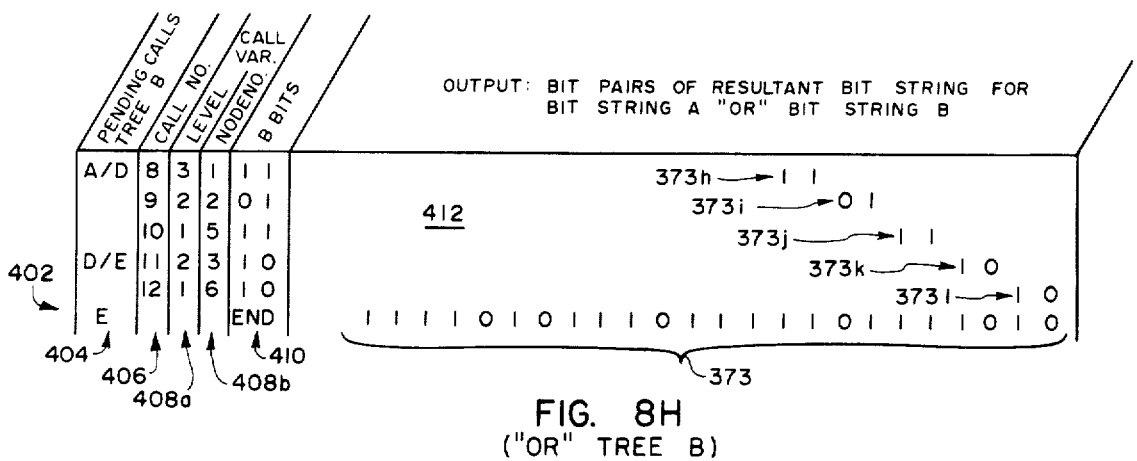
FIG. 8H ("OR" TREE B)

("NOT" - TREE AB)

("NOT" - TREE AB, CONT.)

("NOT" - TREE A)

("NOT"- TREE B)

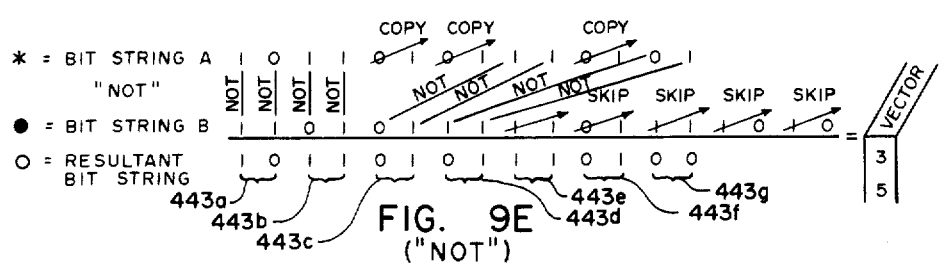
FIG. 9E ("NOT")
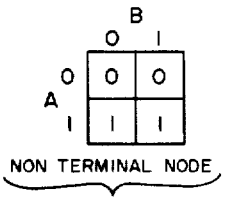
FIG. 9F
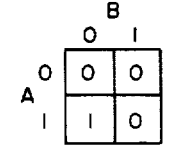
FIG. 9G
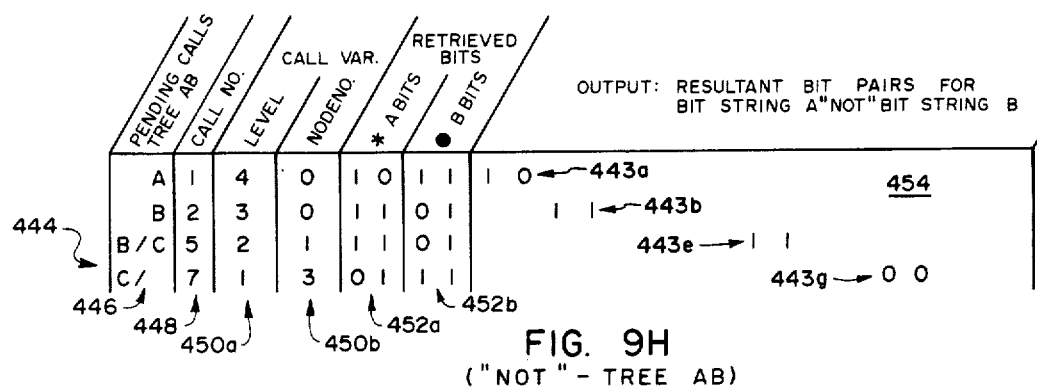
FIG. 9H ("NOT" - TREE AB)
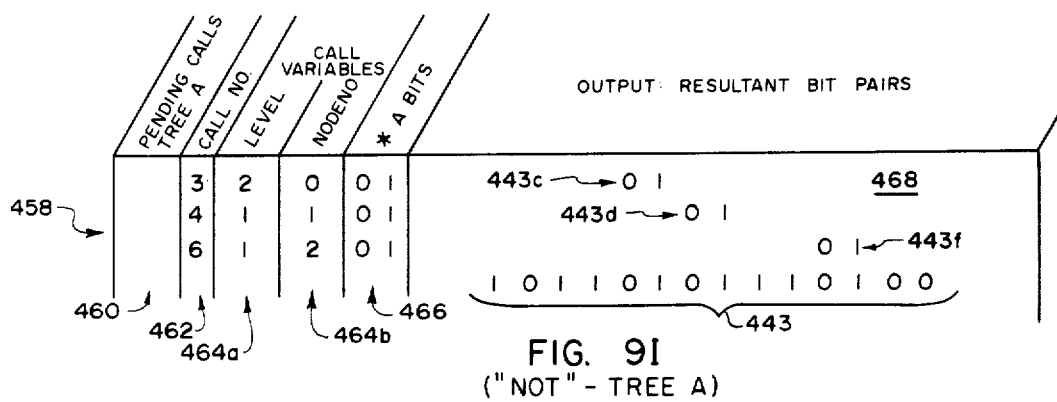
FIG. 9I ("NOT" - TREE A)
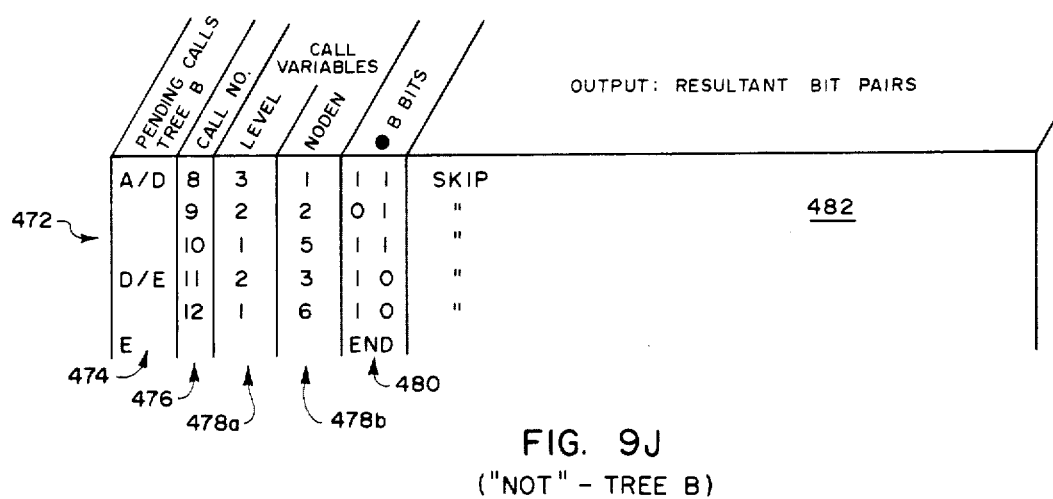
FIG. 9J ("NOT" - TREE B)

COMPUTER SYSTEM AND METHOD FOR DATA BASE INDEXING AND INFORMATION RETRIEVAL

BACKGROUND

1. Field of the Invention

The present invention relates to data base management, and in particular to computer systems and methods for indexing and retrieving individual records stored in a data base.

2. The Prior Art

Over the last two decades advancement in the art of computerized information stoage and retieval have significantly expanded man's capability for efficiently accessing information. Improvements in integrated circuit manufacturing technology have made it possible to greatly reduce the size of computer components while at the same time expanding storage capacity. These advancements in technology have lead to what some have called an "information explosion," since now more than ever before vast resources of information are increasingly available through access to large computer data bases. However, in reality this "information explosion" is more accurately a "data explosion" since it is the amount of data (i.e., computer-stored information), more than the information or knowledge itself, which is rapidly increasing. Thus, with the rapidly increasing improvements in integrated circuit technology and compunter design, one of the significant challenges facing the computer industry has been the development of data base management systems which permit efficient utilization of a computer-stored data base.

The efficiency of computerized information storage and retrieval systems is directly related to how efficiently the data base can be searched and how quickly records from the data base can be retrieved. Especially where a data base is massive, comprehensive indexing of the data base is normally so difficult and time consuming that it is simply not done. Large amounts of computer time may be taken up in having to search an index to find data corresponding to a given request. This is especially so where the data base and data base index require storage on a secondary storage device such as a hard disc drive, which typically works a thousand times slower than a central processing unit. The result is that in computer systems where a massive data base is stored, typically the computer system is "I/O bound." That is to say, the speed of the system is limited by the speed of the disc drives. The CPU is not used to its full capacity because it must wait for long periods of time for the information to be found and retrieved before it can be processed.

On approach which has been used in the prior art to retrieve information from a computer-stored data base is the use of lists. Such lists are generated by searching through the data base for classes of information corresponding to a given attribute. Using this technique, long lists of information are generated, each list corresponding to a particular attribute. Since some of the information in the data base may correspond to more than one attribute, data is often redundantly stored in several lists. In order to then retrieve information which corresponds to a given combination of attributes, the compnter must compare each item in one list with each of the items in the other lists. This approach is not particularly efficient because it requires substantial storage capacity just for the lists, as well as resulting in slow retrieval times.

Other prior art approaches which are used for information storage and retrieval have attempted to render the use of lists more efficient by combining pointers with each list. In this approach, each item in a generated list is provided with an encoded instruction which points to the location of the next item whether it is in the same or an adjacent list. This may somewhat help to eliminate redundant storage of information, and may therefore help to reduce to some extent the size of the index, but searching the index and retrieval of information using this type of approach is still difficult and greatly slows down the retrieval and accessing of information from the data base.

For example, in a data base having about 80 million records with each record requiring approximately one kilobyte of storage, the entire data base will require approximately 80 gigabytes of storage capacity. Using present state-of-the-art technology, storage would typically be provided on approximately one hundred eighty one-half gigabyte hard disc drives. Significantly, using the prior art list or list and pointer type indexing systems, the index to the data base would itself be so large that it would require 80 to 90 gigabytes of storage capacity. Thus, because of the size of the index its use is prohibited and typically information would be accessed only by a single, very specific key. For example, if the data base consisted of genealogical records, to identify an individual one would typically have to know the full name, place and birth date of the individual. As can be appreciated, it would be much more advantageous to be able to do research using less specific keys. However, that becomes extremely difficult due to the large size of the data base and the long retrieval times associated with searching and accessing information in the data base.

More recently attempts to solve the problem of efficient data base management have lead to the development and use of hierarchal trees. See, for example, U.S. Pat. No. 4,318,814 issued Mar. 2, 1982, to Millett et al. In this type of system a hierarchal tree is developed consisting of various levels, each level having a plurality of nodes. The nodes at each level are used to classify the attributes which are to be used for searching the records of a data base. At the terminal nodes of the tree, i.e. those points in the tree where the branches terminate, typically a group of data base records are identified. Such records correspond to the classification for the attributes represented at each preceding node back through the hierarchal structure of the tree. By traversing the tree one may choose different attributes at each level and may assign a "1" or a "0" bit at each node of the tree, depending upon whether the particular attribute for that node is selected. In this manner, each time the tree is searched for a particular combination of attributes a specific bit string may be generated representing one or more paths of the tree. The bit string corresponding to the searched attributes may then be stored for later reference and may be combined with the bit string for other attributes when attempting to identify records corresponding to particular combinations of attributes.

This particular method has proven to be much more efficient than the standard list or lists and pointer approaches. However, the use of such a hierarchal tree containing logically classified attributes is not without its limitation. One of the problems which arises when using this approach is that its efficiency is reduced as the size of the data base begins to grow. Since each terminal node of the hierarchal tree typically represents a group of records, as additional records are added at the terminal nodes one may find that eventually the group of records identified at the terminal nodes of the tree becomes so large that it become difficult to search that group of records, even though the group itself can be located fairly quickly using the structure of the hierarchal tree to search the logically classified attributes that are used to identify that group of records.

Another problem is that as the size of the data base grows, it may be necessary to include additional attributes which means that the classification scheme represented by the tree must be restructed to accommodate additional attributes. This process is difficult as well as requiring fairly large amounts of storage capacity to actually store the hierarchal tree containing the logically classified attributes. Accordingly, while the type of index which relies upon a hierarchal tree having logically classified attributes associated at each level of the tree may work well for a data base which is not too large, which does not require rapid growth or frequent modification of the classification scheme, it nevertheless has definite limitations when used with a massive data base or one in which the number of records of the data base is growing at a rapid rate.

Increasingly, data bases are becoming large and are growing at ever faster rates. For example, in some cases it is not uncommon for a data base to increase on the order of several million records per year. Accordingly, what is needed in the art is a computer system and method which can be used to more efficiently index a massive and rapidly growing data base so that records can be randomly added to the data base without having to restructure the index and where the index can be structured so as to require relatively little storage capacity and yet still permit highly flexible and rapid searching and retrieval of individual records.

BRIEF SUMMARY AND PRINCIPAL OBJECTS OF THE INVENTION

The present invention is a computer system and method for indexing a data base in a manner so that the bit string index (not including headers) requires typically less than one-fifth the storage capacity of the data base and such that virtually every word in each record of the data base can be used as a keyword for searching the index in combination with other keywords. Searching and retrieval of individual records using the computer system and method of the present invention can be accomplished rapidly enough that I/O retrieval can keep up with the central processing unit, thus keeping the CPU busy for a significantly larger part of its time.

Briefly stated, in the system and method of the present invention the computer system creates a vector for each keyword by identifying each record number where the keyword appears and then numerically sorting the record numbers so that for each keyword a sorted vector is created. The computer system next transforms each sorted vector into a bit string. Each bit string is thus identified by one of the keywords and each bit string is made up of bit pairs which represent a particular level and node in a hierarchal tree. Significantly, there is no need to logically classify the keywords which are used in the index. The keywords can be randomly stored in the index and are linked so as to represent a hierarchal tree. Each terminal node of the tree corresponds to a single record of the data base, not to a group of records as in the case with prior art type data base management systems. This has the important advantage that records can be added or deleted from the index without having to group records and without requiring any reclassification and hence restructuring of a hierarchal tree. Retrieval of records corresponding to any combination of keywords is accomplished through the use of the bit strings stored in the data base index. After the keywords have been combined using the bit strings retrieved for such keywords, the resultant bit string is transformed into a sorted vector. The vector is then used to output an identification of the records which contain the combination of keywords in question.

Accordingly, it is a primary object of the present invention to provide an improved computer system and method for indexing and retrieving information from a data base.

Another important object of the present invention is to provide a computer system and method for indexing a data base and for information retrieval wherein the size of the data base index (not including bit string headers) is substantially smaller (i.e., on the order of one-fifth or less) than the size of the data base itself.

Another important object of the present invention is to provide a computer system and method for indexing a data base and for information retrieval wherein the time required to search and retrieve keywords from an index is substantially less than the time required in using data base management systems which have heretofore been known in the art.

Anaother important object of the present invention is to provide a computer system and method for indexing a data base and for information retrieval wherein substantially each word of every record can be used as a keyword in the index without significantly degrading retrieval times.

Yet another important object of the present invention is to provide a computer system and method for indexing a data base and for information retrieval wherein the keywords used in the index for the data base are randomly stored and linked so as to represent a hierarchal tree which does not require any logical classification of the keywords and wherein each terminal node of the hierarchal tree represents an individual record of the data base so that records can be individually accessed and can be added or deleted to the data base at any time without requiring any reclassification or restructuring of a hierarchal tree.

These and other objects and features of the present invention will become more fully apparent from the following description and appended claims.

BRIEF DESCRIPTION OF THE DRAWINGS

FIGS. 7E-7H are charts which illustrate one example of the manner in which the method of FIGS. 7A-7C is implemented;

FIGS. 8E-8H are charts which illustrate one example of how the method of FIGS. 8A-8D is used;

FIGS. 9E-9J are charts which illustrate one example of how the method of the flowcharts of FIGS. 9A-9D is used.

Reference is next made to a detailed description of the presently preferred embodiments in which like parts are designated with like numerals throughout.

DETAILED DESCRIPTION OF THE PRESENTLY PREFERRED EMBODIMENT

1. Introduction

The system and method of the present invention will find a wide variety of applications for indexing virtually any type of data base. However, the system and method of this invention are particularly adapted for very large scale data bases and/or data bases which are anticipated to increase at a rapid rate. Typically the data base will consist of a number of records which are to be individually accessed through the computer indexing and retrieval system. The particular unit of information used as an individual record in a data base will, of course, vary depending upon the type of information from which the data base is made. For example, in the case of a library the individual records of the data base could consist of the library catalog card information plus an abstract of the book referenced by the library card. Alternatively, each individual record could consist of information indentifying a particular book and a particular page in the book. In the case of a data base used for genealogical information, each individual record could consist of the name of a person together with the information concerning the person's date and place of birth, date and place of death and any other pertinent information relating to that person. Accordingly, it will be appreciated that the system and method of the present invention may have a virtually unlimited number of applications in terms of indexing any of a wide variety of types of data bases so as to provide the capability for rapidly searching the index and retrieving individual records of the data base.

2. Overview of the System and Method: FIGS. 1 through 4

Figure 1:
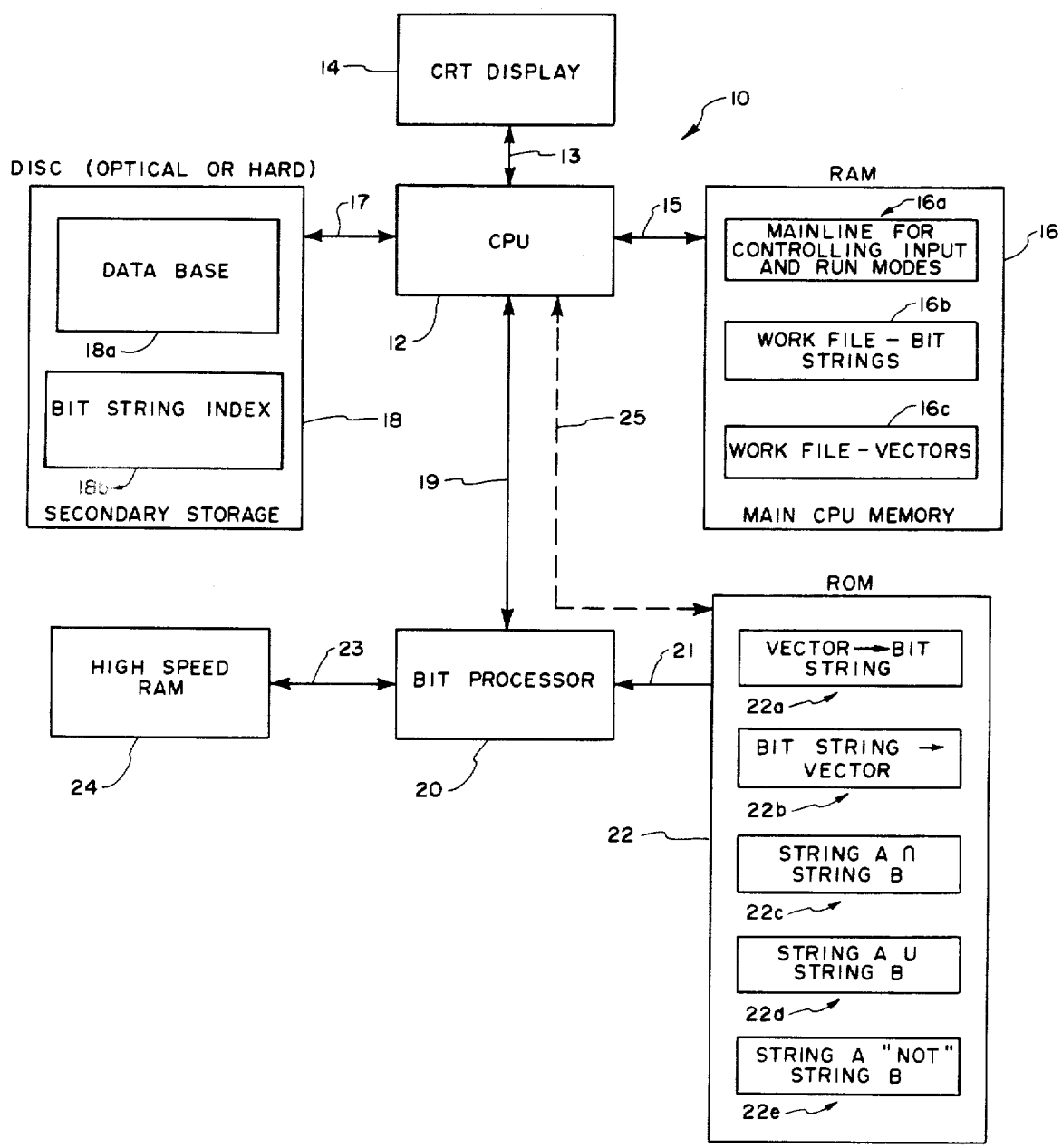
FIG. 1 is a block diagram schematically illustrating the computer system of the present invention.
Figure 2:
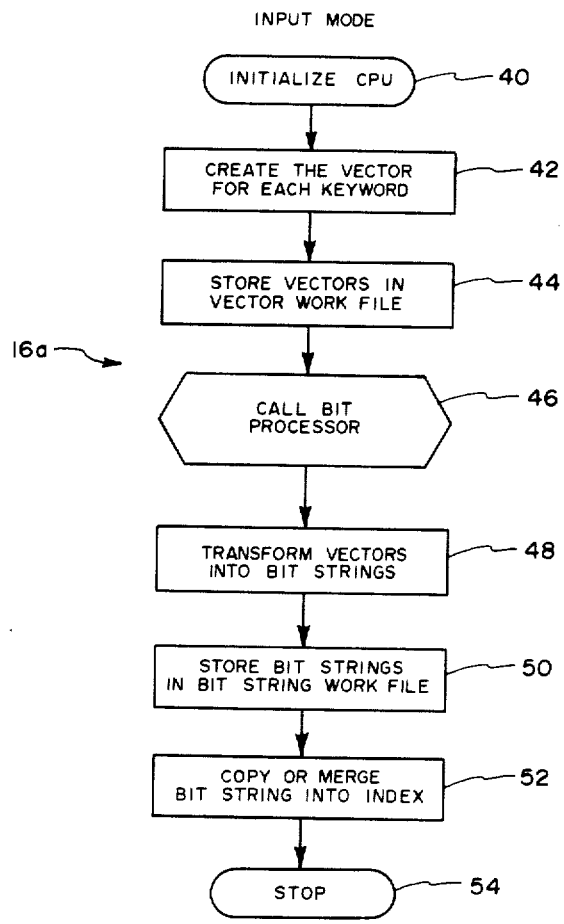
FIG. 2 is a flowchart which diagrammatically illustrates the operation of the computer system during an input mode used to create a bit string index for the data base.

Reference is first made to FIG. 2 which generally illustrates the system of the present invention. As shown in FIG. 1, a central processing unit (CPU) 12 is connected as shown at line 13 to an input/output terminal 14 such as a standard CRT terminal. The CPU 12 may be any commercially available main-frame computer, minicomputer or microprocessor. For example, CPU 12 may be an Intel 8086 microprocessor.

As hereinafter more fully described, the system generally illustrated in FIG. 1 is controlled by the operational instructions contained in the system mainline generally designated at file 16a of the main CPU memory 16. The main CPU memory 16 consists of a random access memory (RAM) which communicates with the CPU 12 as indicated at line 15. Other files contained in the main CPU memory 16 include a first work file 16b for temporarily storing bit strings and a second work file 16c for temporarily storing vectors.

CPU 12 also communicates as indicated at line 17 with a secondary storage device such as a standard optical or hard disc drive. The secondary storage device 18 is used for storing the individual records of the data base, as indicated at 18a and also for storing a bit string index as indicated at 18b, as hereinafter more fully described. The index 18b is used for rapid identification and retrieval of the individual records contained in the data base 18a.

CPU 12 also communicates as indicated at line 19 with a special purpose bit processor 20. The bit processor 20 may consist of any commercially available processor, such as a Motorola series 68000 processor. The bit processor 20 is controlled by a series of operating instructions contained in a read only memory (ROM) 22 which communicates as indicated at line 21 with the bit processor 20. As shown in FIG. 1, read only memory 22 contains the operating instructions for five subroutines indicated at 22a-22e. As hereinafter more fully described, the operating instructions for the subroutines contained at files 22a-22e in ROM 22 are used to transform each ventor into a bit string which is then stored in the bit string index 18b, as well as for transforming bit strings which have been retrieved and processed back into a vector representation from which the individual records of data base 18a can be identified and output by the CPU 12. Subroutines for logically combining the bit strings corresponding to two or more keywords can also be performed using logical "AND," "OR," or "NOT" operations as indicated at the subroutines generally designated at 22c-22e.

Bit processor 20 is also connected as shown at line 23 to a high speed random access memory 24 which is used as a scratch pad memory by the special purpose bit processor 20 in keeping track of pending calls which are generated by the subroutines 22a-22e, as described further below.

In an alternative embodiment of the system the special bit processor 20 and high speed RAM 24 may be eliminated and the subroutines contained in ROM 22 may be accessed directly by CPU 12, as indicated at the dashed line 25. The particular system used will depend primarily on the size of the data base that is to be handled by the system. For a very large scale data base the system which employs the special bit processor 20 will typically provide superior results. Smaller data bases may be adequately handled by a system which does not require the use of a special bit processor.

Reference is next made to FIG. 2 which schematically illustrates in the form of a flowchart indicated generally at 16a the operating instructions contained in the mainline of CPU memory 16 which are used to control the system operation during an input mode. When using the system during the input mode, the system generates the bit string index 18b that is later used to access and retieve individual records of the data base 18a.

As shown in the flowchart of FIG. 2 at step 40, the CPU is first initialized. The CPU then moves to step 42 where it creates a vector for each keyword that is to be used in the index. The vector for each keyword is created by taking each record of the data base and scanning the record to determine whether that particular keyword is present in the record. Each record is identified by a number and after the records have been scanned for all keywords, the CPU then provides a numerically sorted list for each keyword which identifies by that record number each record in which the keyword is present.

Figure 2A:
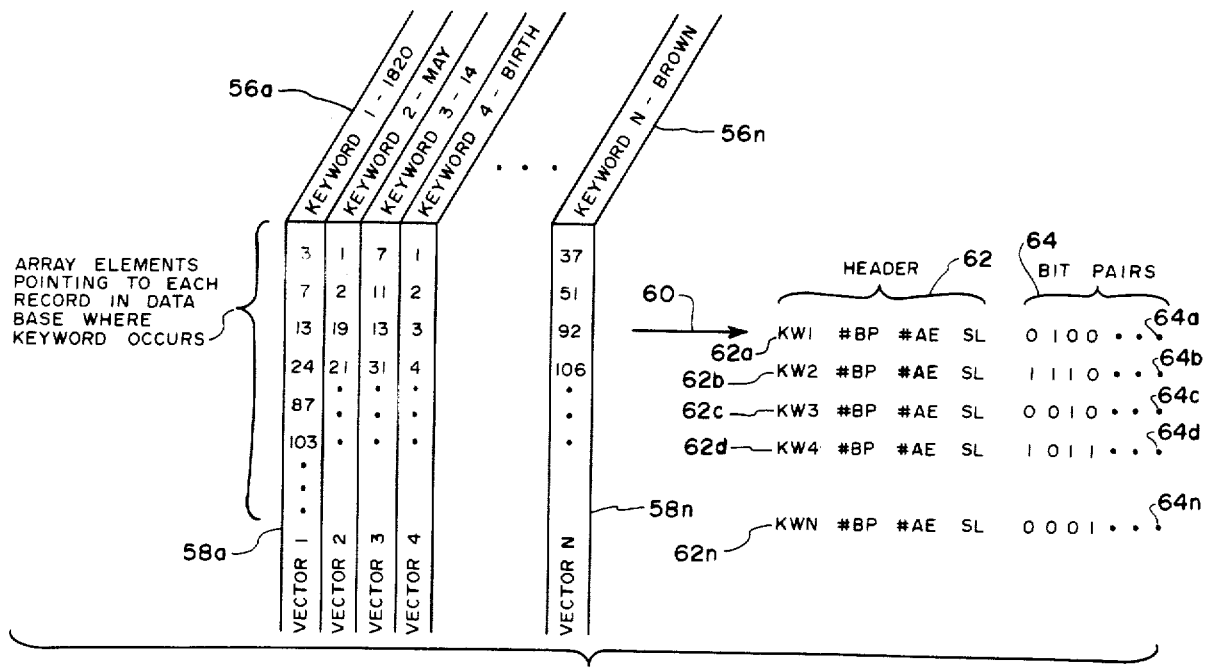
FIG. 2A is a diagram which schematically illustrates the transformation of the vector for each keyword used in the index into a corresponding bit string.

For example, as shown in FIG. 2A, in the case of a data base for genealogical information, each keyword 56a-56n may consist of information such as a year (1820), a month (May), a day in a month (the 14th day), a person's birth as well as a first or last name of a person (Brown). For each keyword 56a-56n, the CPU then prepares a numerically sorted list of array elements 58a-58n identifying each separate record number in the data base where that particular keyword occurs. For example, vector 1 for the keyword "1820" indicates that record numbers 3, 7, 13, 24, 87, 103 etc. contain that keyword. Significantly, as hereinafter more fully explained, the system and method of the present invention provide a powerful indexing and information retrieval capability so that when using the system and method of the present invention, it is possible to designate substantially each word in each record as a keyword to be used in the index. This provides significantly increased capability for searching the index and retrieving information, as explained further below.

Once the CPU 12 has created the sorted vectors 58a-58n (see FIG. 2A) for each keyword 56a-56n, the CPU 12 next moves to step 44 (see FIG. 2) and stores the vectors in the vector work file 16b of the main CPU memory 16. CPU 12 then calls the special purpose bit processor 20 as indicated in step 46. The special purpose bit processor 20 calls the subroutine 22a from RAM 22 which controls the processor 20 such that as each vector 58a-58n is sent to the processor 20 by CPU 12, it is transformed into a bit string and then returned to CPU 12 where it is then stored in work file 16b.

As schematically illustrated in FIG. 2A, each bit string comprises a header as indicated at 62 in addition to the bit pairs 64 which are formed from one of the vectors. For example, as shown in FIG. 2A the vector 58a for keyword 1 may be transformed as schematically indicated by the arrow 60 into a bit string which includes a header 62a and a number of bit pairs 64a. The header 62a identifies keyword 1 (KW1), as well as the number of bit pairs (#BP) in the bit string, the number of array elements (#AE) in the vector 58a and the starting level (SL) in a hierarchal tree represented by the bit string.

Figure 3A:
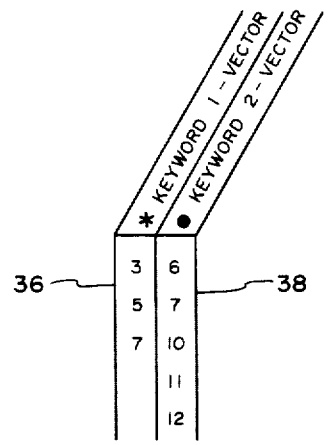
FIG. 3A schematically illustrates the manner in which vectors formed for each keyword may be identified in a hierarchal tree.
Figure 3B:
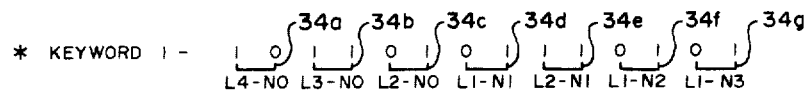
FIGS. 3B and 3C schematically illustrate bit strings formed for each of the vectors shown in FIG. 3A and further illustrate the manner in which each bit string represents the levels and nodes in a hierarchal tree.
Figure 3C:
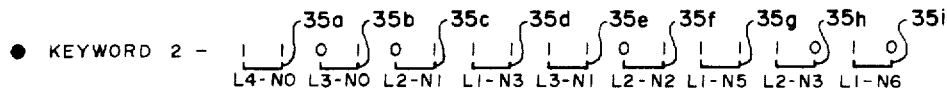

As schematically illustrated in FIGS. 3A-3D, the bit pairs of each bit string 62 represent levels and nodes of a hierarchal tree. For example, in FIG. 3A a sorted vector 36 for a first keyword, when transformed into a bit string for that keyword (see FIG. 3B) may consist of a bit string (not including the header portion of the bit string) which contains seven bit pairs as indicated at 34a-34g. Similarly, the sorted vector 38 for a second keyword may be transformed into a bit string as illustrated in FIG. 3C which consists of nine bit strings 35a-35i.

Figure 3D:
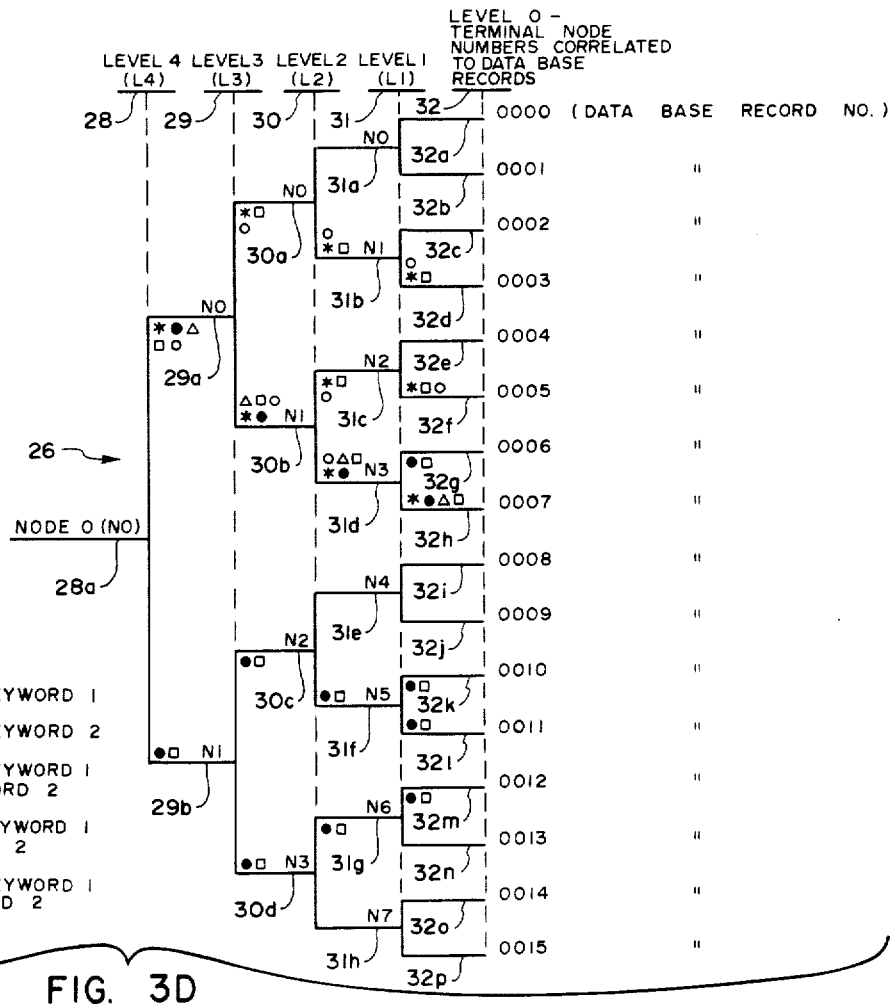
FIG. 3D schematically illustrates a hierarchal tree represented by the bit strings for keywords 1 and 2 which are illustrated in FIGS. 3B and 3C.

Each bit pair of each bit string represents a level and a node in a hierarchal tree. For example, FIG. 3D illustrates a hierarchal tree generally designated at 26 which consists of a plurality of levels as indicated at 2832. The dashed line extending from each level indicates where the level occurs in the structure of the hierarchal tree. At each level there are one or more nodes which correspond to various branches in the tree structure. For example, at level 4 there is one node (N0) as indicated at 28a. At "level" 3 there are two nodes (N0, N1) as indicated at 29a and 29b, whereas at level 2 there are four nodes (N0N3) as indicated at 30a-30d and so forth. At level 0 (indicated at 32) there are a plurality of terminal nodes (0000-0015) indicated at reference numerals 32a-32p. The numbers 0000-0015 at each terminal node 32a-32p represent individual records in the data base 18a. Thus, in the case of the vector 36 for the first keyword (see FIG. 3A), terminal nodes 32d, 32f and 32h identify records 3, 5 and 7 of the data base. The vector 38 for the second keyword is illustrated as containing records 6, 7, 10, 11 and 12 of the data base, which are represented at the terminal nodes 32g, 32h, 32k, 32l, and 32m.

Importantly, it should be recognized that no classification of the record numbers as represented in the hierarchal tree 26 need be provided; in fact the records will typically be randomly ordered. Moreover, records can be added or deleted at any terminal node 32 without altering any classification scheme, since none is required. This makes the system and method of the present invention particularly useful for a rapidly growing data base.

As indicated in FIGS. 3B and 3C, the bit strings for keywords 1 and 2 consist of bit pairs 34a-34g and 35a-35i which represent various levels and nodes in the hierarchal tree 26. The "1" bits in a bit string represent a path through the hierarchal tree leading to the individual records contained in the keyword vector. For example, in the case of keyword 1, the "1" bits are traced in FIG. 3D with an asterisk (*) showing each node in the hierarchal tree 26 which represents the paths for identifying records 3, 5 and 7. Similarly, the dot symbol traces each "1" bit for keyword 2 in order to identify the terminal nodes of the tree for the records contained in keyword 2. Thus, as can be seen from FIGS. 3B, 3C and 3D, each bit pair in each bit string represents a level and a node in the hierarchal tree 26. In the case of keyword 1, the first bit pair indicated at 34a shows (see FIG. 3B) that at level 4 (L4) node 0 (N0), the branch leading to node 0 of level 3 is identified with a "1" bit whereas the branch leading to node 1 of level 3 is identified with a "0" bit. The next bit pair 34b for keyword 1 indicates that at level 3 (L3) and node 0 (N0), both branches leading to level 2 are identified by "1" bits as part of the path leading to the desired records in the data base.

Referring again to FIG. 2, once each of the vectors has been transformed by processor 20 into a corresponding bit string which is identified by the keyword for that vector and stored by CPU 12 in work file 16b, the bit strings are then copied by CPU 12 from the work file 16b into the bit string index 18b of the secondary storage device 18, as indicated at step 52. In the alternative, as hereinafter more fully explained, where records are being added to or deleted from the data base, the bit strings which are formed from the vectors are merged with other existing bit strings so as to update those bit strings by adding to or deleting from the updated bit string paths leading to the added or deleted records of the data base. Once the CPU 12 has copied or merged the bit strings from file 16b into the bit string index 18b, the input mode is completed as indicated at step 54.

Figure 4:
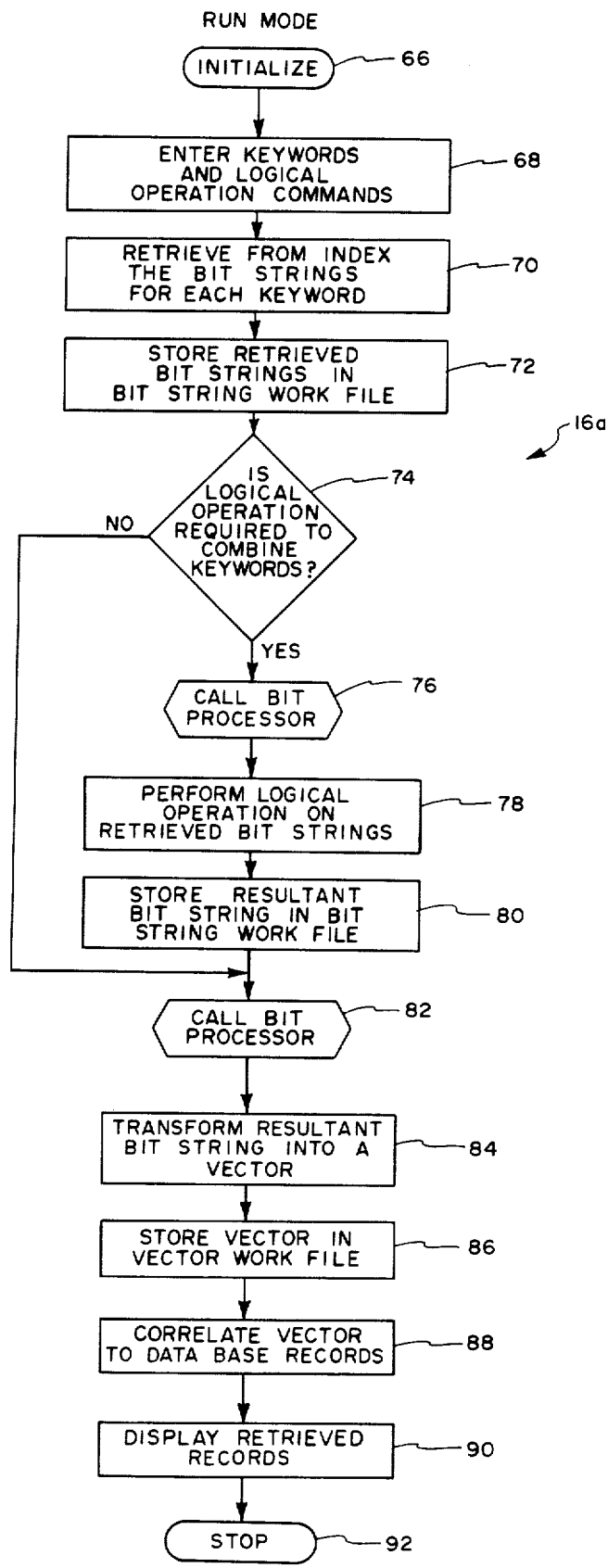
FIG. 4 is a flowchart illustrating the manner in which the computer system of FIG. 1 is operated during a run mode during which individual records may be accessed using the system and method of the present invention.

The system is then ready to be used in the run mode, which is generally designated at 16a by the flow diagram of FIG. 4. Again the CPU 12 is initialized at step 66 and then any keywords contained in the index 18b can be entered at the input/output terminal 14 as indicated at step 68. Along with the keywords that are entered, the CPU 12 can also be instructed to join the keywords using logical operations such as keyword 1 "AND" keyword 2, keyword 1 "OR" keyword 2 or keyword 1 "NOT" keyword 2, or using any combination of those logical operations. CPU 12 then moves to step 70 and retrieves from the bit string index 18b the bit string identified by each keyword input to the CPU 12. The retireved bit strings are then stored as indicated at step 72 in the work file 16b.

CPU 12 next checks at step 74 to determine whether a command instruction was entered requiring that the keywords be joined using any of the logical operations mentioned above. If the keywords are not to be joined using any logical operation, CPU 12 calls special purpose bit processor 20 as indicated at step 82. Bit processor 20 then transforms (step 84) the bit string which is sent to it by CPU 12 back into a vector. The vector is sent to CPU 12 and stored at step 86 in work file 16c. The individual records of the data base identified by the vector are correlated to the data base at step 88 then output as indicated at step 90.

If CPU 12 determines at step 74 that the keywords which are input include a command instructing the CPU 12 to join those keywords using one of the logical operations, CPU 12 moves to step 76 and calls the special bit processor 20 which then performs the logical operation (step 78) on the bit strings which are retrieved for the keywords. For example, if keyword 1 is to be joined by an "AND" operation with keyword 2, the bit strings for keyword 1 and keyword 2 are combined using the "AND" operation so as to form a resultant bit string which is then transferred back to CPU 12 and stored as indicated at step 80.

Once all of the retrieved bit strings have been processed by the special purpose bit processor 20 the resultant bit strings are then each transformed into a vector as indicated at step 84, the vector is then returned to CPU 12 and is stored in the vector work file 16c. Each vector is then retrieved by CPU 12 and individual records contained in each vector are identified and output at the input/output terminal 14.

Significantly, the entire index for the data base consists of a series of highly dense bit strings. The retrieval of any keyword contained in the index as well as the retrieval of any combination of keywords contained in the index is accomplished by operating solely upon the bit strings which have been stored in the index. Only after the desired keywords have been retrieved and processed are the resultant bit strings transformed back into vectors for purposes of record identification.

This system and method results in several important advantages. In particular, the hierarchal tree represented by the bit strings does not require any classification of the keywords which form the data base index. Thus, records can be randomly added to or deleted from the data base without having to revise any classification scheme. Accordingly, the system and method of the present invention are particularly well suited for a very large and/or rapidly growing data base. Moreover, the bit string index (not including headers) is highly compressed and typically does not require more than one-fifth the number of bytes required for storage of the overall data base. Because the index can be compressed and stored so efficiently and can be accessed and processed so rapidly, when using the system and method of the present invention it is possible to use substantially every word in each record as a keyword in the index without seriously grading retrieval times. As can be appreciated, this greatly increases the accessibility of information contained in a large data base.

Figure 5:
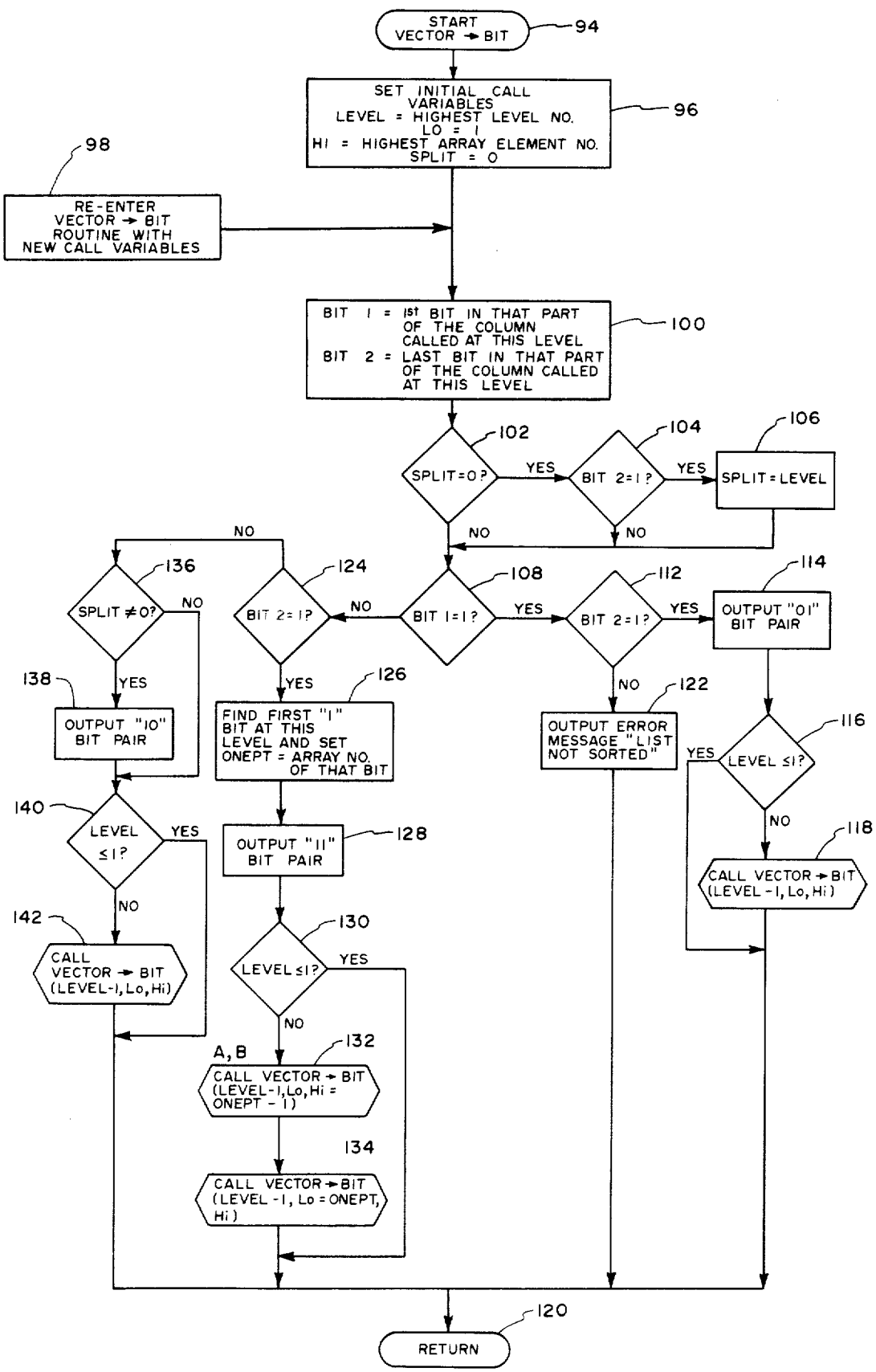
FIG. 5 is a flowchart which illustrates one presently preferred embodiment of a method for transforming vectors into bit strings using the system and method of the present invention.
Figure 5A:
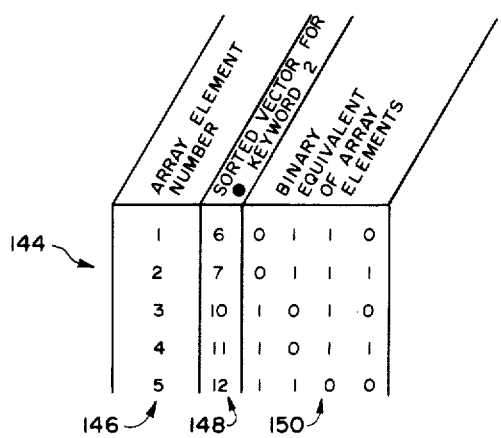
FIGS. 5A-5C are charts illustrating one example of how the method embodied in the flowchart of FIG. 5 is implemented.
Figure 5B:
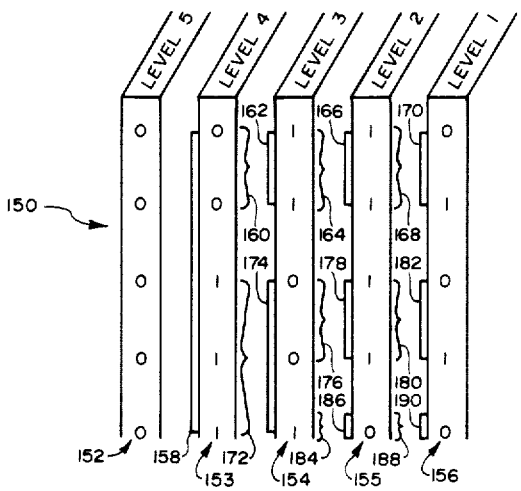
Figure 5C:
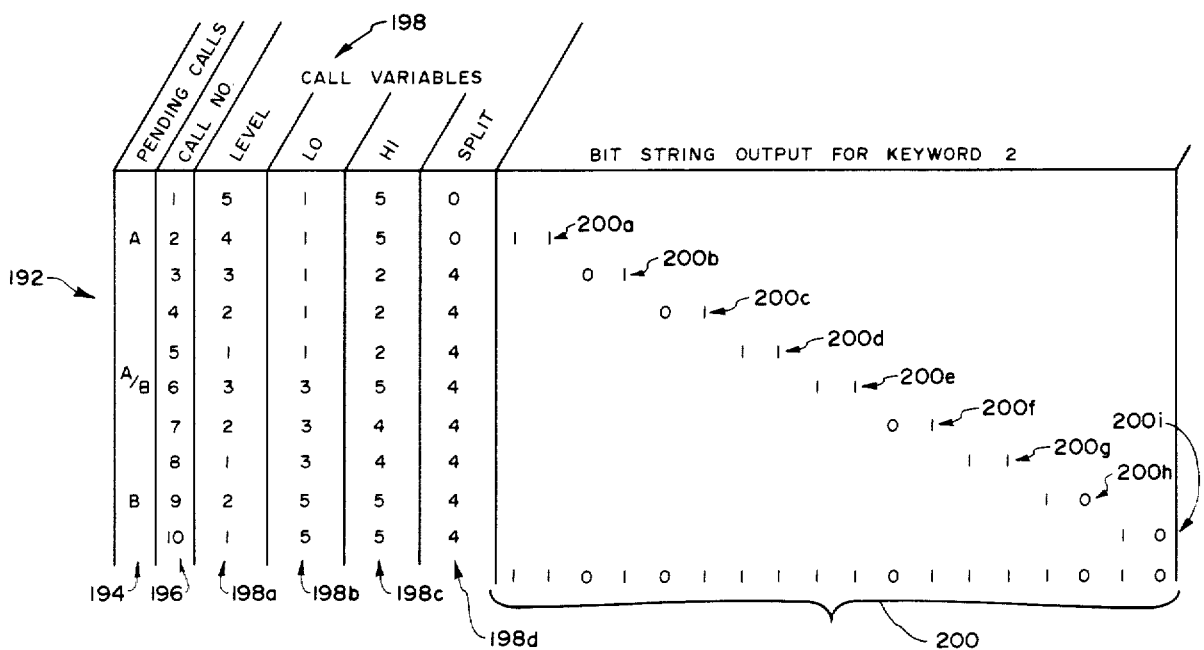

Reference is next made to FIGS. 5–5C which illustrate in greater detail a presently preferred embodiment of a method used for transforming vectors to bit strings.

3. The Method for Transforming Vectors to Bit Strings: FIGS. 5–5C

Referring next to FIG. 5A, the diagram generally designated at 144 includes three columns which are indicated at 146, 148 and 150. Column 148 identifies the sorted records in the vector 38 for keyword 2 (see FIG. 3C). Column 146 to the left of column 148 indicates the array element number of each of the array elements (records) contained in the vector 38. Column 150 to the right of column 148 contains the equivalent binary number for each of the array elements in the vector. For example, the binary number for the first array element (which is number 6) is 0110. Similarly, the binary number for the fifth array element (which is number 12) is 1100.

The diagram generally indicated at 150 in FIG. 5B represents a binary matrix formed by converting each of the array elements of the vector 38 into its corresponding binary number. Each row in the matrix represents the binary number for one of the array elements and each column 152–156 corresponds to a level in the hierarchal tree 26 (see FIG. 3D). As illustrated in FIG. 5B, the binary number for each array element of the vector may include a number of leading zeros such as indicated at column 152 in FIG. 5B.

The brackets which are indicated at th ledt and righthand sides of the columns 152–156 are used to indicate the sequence and manner in which the special purpose bit processor 20 calls and processes different groups of bits from each column in order to transform vector 38 into a bit string. In particular, the bit processor 20 first determines at which level a column contains both zeros and ones. In the example illustrated in FIG. 5B, column 153 for level 4 is the first column where both ones and zeros appear in the column. The bit processor 20 next groups the bits in column 153 into zeros and ones as indicated at the brackets 160 and 172 at the right of column 153. The processor 20 then determines whether the first and last bit in each such group are both ones, or are both zeros or whether the first bit is a zero and the last bit is a one. If the first and last bits are ones, a bit pair for the bit string is output which is a "01". If the first and last bits in the group are zeros, the bit pair which is output for the bit string is a "10." If the first bit is a zero and the last bit is a one, the bit pair output for the bit string is a "11." For example, in FIG. 5B the first bit pair output for the bit string which is formed from the vector 38 for keyword 2 would be a "11" since the first and last bit in the group of bits designated by the bracket 160 are both zeros.

The bit processor 20 processes the binary matrix from left to right and from top to bottom. For example, after the group of bits 160 in column 153 have been processed, the processor 20 uses the number of bits in the first group 160 to determine the number of bits which will be examined in the next column 154. Thus, the bits indicated by the bracket 162 shown at the left of column 154 will be called next. The bits in that group will be divided into groups containing zeros or ones, if applicable. In this case since only ones are present, only a single group is formed as indicated by the bracket 164 at the right of the column 154. The first and last bit in group 164 are then tested to determine whether they are both ones, both zeros, or zero and one. Since both bits are ones, the next bit pair of the bit string is output as a "01."

The bit processor 20 continues in this fashion, calling next the group of bits indicated at 166 in column 155 (level 2), outputting another "01" for that group of bits and then calls the group of bits 170 for the column 156 (level 1). In this case since the first bit is zero and the last bit is a one, the next bit pair is a "11." The processor 20 then returns to level 4 and examines the next group of bits in column 153, which is indicated at bracket 172. Since the first and last bit in the group 172 are both ones, the bit pair output for that group is a "01." Processor 20 then calls the corresponding group of three as indicated at 174 in the next column 154 for level 3. Since there are both zeros and ones in that group of bits, processor 20 divides that group as indicated at 176 and 184 into two separate groups. For the upper group of bits 176, since both the first and the last bit in the group are zeros, a bit pair is output which will be "10."

The processor 20 next calls the corresponding group of two bits from column 155 (level 2) as indicated at 178. For the group 178 the bit pair "01" will be output since the first and last bit of group 178 are both ones. Processor 20 then calls the next group 182 in the last column 156 and outputs a "11" since the first bit is zero and the last bit is one. Processor 20 next returns to level 3 to process the third bit group as indicated at 184. Since there is only one bit in this group, the first and last bit are both ones and a "01" is output. Similarly, the last two bit groups which are examined by processor 20 will be the group 186 and then group 190 in columns 155 and 156, respectively. For each of those groups, since there is only one bit in the group and since that bit is a zero the processor 20 will treat each group as having zeros for both the first and last bit and will therefore output a "10" in each case.

Importantly, using this method each binary matrix can be transformed into a highly compressed bit string. For example, on the average each bit string will contain approximately one one-fifth the number of bits contained in the corresponding binary matrix.

One example of a flow diagram which implements the foregoing method for converting the binary matrix of a vector to a highly compressed bit string is illustrated in FIG. 5. Implementation of the flow diagram of FIG. 5 is illustrated in chart 192 of FIG. 5C using the binary matrix formed from the sorted vector 38 for keyowrd 2. The flow diagram of FIG. 5 is a recursive routine, meaning that there are several calls in the routine which cause the routine to re-enter itself each time the call variables are changed. Using this mechanism, the bit processor 20 is able to process the binary matrix in the left-to-right top-to-bottom sequence described in connection with FIG. 5B.

In chart 192 of FIG. 5C, four columns are indicated. The first column 194 identifies pending calls which indicate to the processor 20 at which point in the binary matrix the processor 20 must return to complete the left-to-right, top-to-bottom sequence. Column 196 in chart 192 identifies the call number which is being processed by the routine, column 198 identifies the call variables, which in this instance include four variables as indicated at columns 198a-198d. Call variable "level" is the highest level number at which the processor first detects that a column in the binary matrix contains both zeros and ones. The call variable "lo" is initially set at 1 and the cell variable "hi" is initially set so that it is equal to the highest array element number in the first column that is called. The call variable "split" is initially set to zero and is used to identify the first level at which both zeros and ones are detected.

As indicated at step 94 in FIG. 5, the subroutine is first initialized by the processor 20 which then moves to step 96 and sets the initial call variables. Using the binary matrix 150 indicated in FIG. 5B, for the first call the "level" variable is 5, the "lo" variable is initialized at 1 and the "hi" variable is initialized at 5. The call variable for "split" is also initialized at 0.

Processor 20 next moves to step 100 in FIG. 5 and sets the first bit in that part of the column which is called at this level to "bit 1" and sets the last bit in that part of the column called at this level equivalent to a variable called "bit 2." Processor 20 then moves to step "split" equals zero. If so, the processor 20 moves to step 104 and checks to determine whether "bit 2" (the last bit in that part of the column called) is 1. In the example of FIG. 5C, for call number 1 "bit 2" equals zero, so processor 20 moves next to step 108 where it checks to determine whether "bit 1" (the first bit in that part of the column called) is 1. Since it is not the processor 20 moves to step 124 and determines that the last bit in the column is not 1 so it then determines at step 136 whether the call variable "split" is not equal to 0. For the first call "split" was set to zero, the answer is no, so the processor 20 moves to step 140 where it checks to determine whether the call variable "level" is less than or equal to 1.

Since the call variable "level" was set at 5 initially, the processor 20 moves to step 142 which calls the vector to bit subroutine again and decrements the call variable "level" by one. Thus, as shown in the chart 192 of FIG. 5C, for call number 2 the variable "level" will be 4, "lo" will be 1, "hi" will still be 5 and "split" will still be 0. The subroutine is thus re-entered at step 98 with the new call variables and the process is repeated. However, during the second call since the processor 20 is now on column 153 for "level" 4 (see FIG. 5B) at step 102 it will be determined that both zeros and ones appear in the column. Also, at step 104, it will be determined that the last bit in the column 153 is a 1, and the call variable "split" will be set to that level (in this case 4) at step 106.

Processor 20 will next move to step 108 where it will check to determine whether the first bit in the group of bits 158 which have been called is a 1. Since it is not, processor 20 will move to step 124 where it will check whether the last bit in the group 158 is a 1. Since the answer is yes the processor 20 will move to step 126 where it will find the first "1" bit in column 153 and will set a flag designated as "1 point" (ONEPT), setting the flag equal to the array number of that bit. For call number 2, the array element number of the first "1" bit in group 160 is 3 so one ONEPT will equal 3. Processor 20 then outputs the first pair of bits "11" as indicated at 200a in chart 192. Processor 20 then checks at step 130 to determine whether "level" is less than or equal to 1. For call number 2 "level" is 4, and the processor 20 then moves to step 132 and calls the vector to bit subroutine again, this time decrementing "level" to 3 and changing the call variable for "hi" toONEPT minus one. Thus, as shown in chart 192, the third time the subroutine is entered the call variables will be 3, 1, 2 and 4.

As previously indicated the subroutine requires the processor 20 to examine each preceding column at each level starting from left to right and going from top to bottom based upon the number of bits grouped in each column. Since in level 4 there were two groups of bits as indicated at 160 and 172 (see FIG. 5B), for call number 3 which occurs at level 3 only the number bits indicated by group 162 (FIG. 5B) are called. Processor 20 sets "bit 1" and "bit 2" at step 100 both equal to 1. At step 102 since "split" is not equal to zero, processor 20 moves directly to step 108 where it determines that "bit 1" is 1 and then moves to step 112 where it determines "bit 2" is also 1, and then moves to step 114 to output the next bit pair 200b (FIG. 5C). Processor 20 then moves to step 116 where it determines that it has not yet reached the first level so it decrements the call variable "level" at step 118 and then re-enters the routine at step 198 with the call variables for the fourth call.

For call number 4 the processor 20 will call the group of bits indicated at 166 (FIG. 5B) for level 2, and will again set "bit 1" and "bit 2" equal to the first and last bits in that group, which in this case are both 1. The processor 20 will therefore follow the exact same procedure as in the last call, and will output the next bit pair 200c as indicated in FIG. 5C. After outputting the next bit pair 200c the processor 20 will move to step 118 where the call variable for "level" is again decremented and the processor 20 then re-enters at step 98 for call number 5 with the new call variables 1, 1, 2 and 4 as indicated in FIG. 5C.

For call number 5 the first group of bits which is called at level 1 is the group of bits indicated at 170 in FIG. 5B. Processor 20 thus sets "bit 1" equal to 0 and "bit 2" equal to 1 at step 100. Processor 20 then determines that "split" is not equal to 0 at step 102 and moves to step 108 where it determines that "bit 1" is not equal to 1. At step 124 the processor 20 determines that "bit 2" is equal to 1 and therefore moves to step 126. There it determines that both ones and zeros are present in group 170. The processor sets the flag "ONEPT" equal to the array element number where the first "1" bit occurs, in this case array element number 2. Processor 20 then outputs the next bit pair "11" at step 128, as indicated at 200d in FIG. 5C. Since at step 130 the level is equal to 1, processor 20 jumps to step 120 which is a return instruction. Processor 20 then returns back to column 153 where pending call A was set at "level" 4, so that the second group 172 will then be examined in accordance with the left-to-right top-to-bottom sequence. Each pending call is recorded by processor 20 in RAM 24.

From pending call A (i.e., call No. 2), processor 20 moves to step 134. "Level" is decremented from 4 to 3, the call variable for "lo" will be array element 3 and the call variable for "hi" will be array element 5. The call variable for "split" will remain the same. Thus, for call number 6, the processor 20 will look at the three bits in column 154 of level 3 since three bits were present in group 174. "Bit 1" will be set to 0 and "bit 2" will be set to 1 at step 100. Processor 20 will then drop through step 102 to step 108 where it will determine that "bit 1" is not equal to 1 and will then determine at step 124 that "bit 2" is equal to 1, thereby moving to step 126. At step 126 the flag "ONEPT" will be set to array element number 5, which corresponds to the first "1" bit in group 174. Processor 128 will then output the next bit pair 200e, which will be "11" as indicated in the chart 192 of FIG. 5C. Processor 20 then determines that "level" is not less than or equal to 1, so processor 20 moves to step 132 where the vector-to-bit routine is called again, decrementing the call variable "level" and setting the "hi" call variable to ONEPT minus one.

As indicated in chart 192 of FIG. 5C, for call number 7 the call variable "level" will be 2, call variable "lo" will be 3 and call variable "hi" will be 4. Call variable "split" will remain the same. For call number 7, the group of bits 178 will be retrieved by the processor, thus setting "bit 1" to 1 and setting "bit 2" to 1 at step 100. Processor 20 will then drop through to step 108 where it will determine that "bit 1" is 1, and then move to step 112 where it will determine that "bit 2" is 1, thus outputting at step 14 the next bit pair 200f which will be "01" as shown in FIG. 5C. Processor 20 will then determine that the level is not less than or equal to 1 at step 116, and will then call the vector-to-bit routine for the next call.

For call number 8 as shown in FIG. 5C, "level" will be 1, "lo" will be 3, "hi" will be 4, and "split" will again remain the same. The next group of bits to be called will be group 182 of level 1, which will result in outputting the bit pair 200g in FIG. 5C. Processor 20 will then return to level 3 to complete the pending call B by processing the bit group 184. Thus call number 9 will complete the pending call B for the bits in the column 154 of level 3.

Since there is only one bit in group 184, both "bit 1" and "bit 2" will be set to 1 at step 100, and processor 20 will then drop through the step 108 and 112 where it will determine that both "bit 1" and bit 2 are 1. A "01" will be output at step 114 for the next bit pair, as indicated at 200h in FIG. 5C. Processor 20 will then move through step 116 to step 118 for the last call.

In this call the call variable for "level" will be 1, the call variable for "lo" will be 5, and the call variable for "hi" will be 5. "Split" will remain the same. Since there was only one bit in group 188 of level 2, this call likewise will result in calling only the last bit in column 156. Thus, "bit 1" and "bit 2" will both be set to 0 at step 100 and processor 20 will move through the flowchart to step 138 where the last bit pair 200*i* will be output as a "10." Processor 20 will then determine at step 140 that "level" has reached 1, and will then move to step 120 signaling the bit processor 20 that the vector for keyword 2 has been transformed to the bit string as indicated at 200 in FIG. 5C. It should be noted from step 112 of FIG. 5 that if the first and last bits from a group ever correspond to "10," then the vector has not been sorted, causing the error message at step 122 to be output.

The bit string 200 is sent to CPU 12, which will store the bit string in the bit string work file 16*b*. In this manner, the vector for each keyword will be first transformed into a binary matrix which in turn will be processed in the indicated manner so as to form a bit string which is identified by the keyword. After all of the bit strings have been formed, they are then either copied or merged with other existing bit strings into the data base index 18*b*.

Figures 6, 6A:
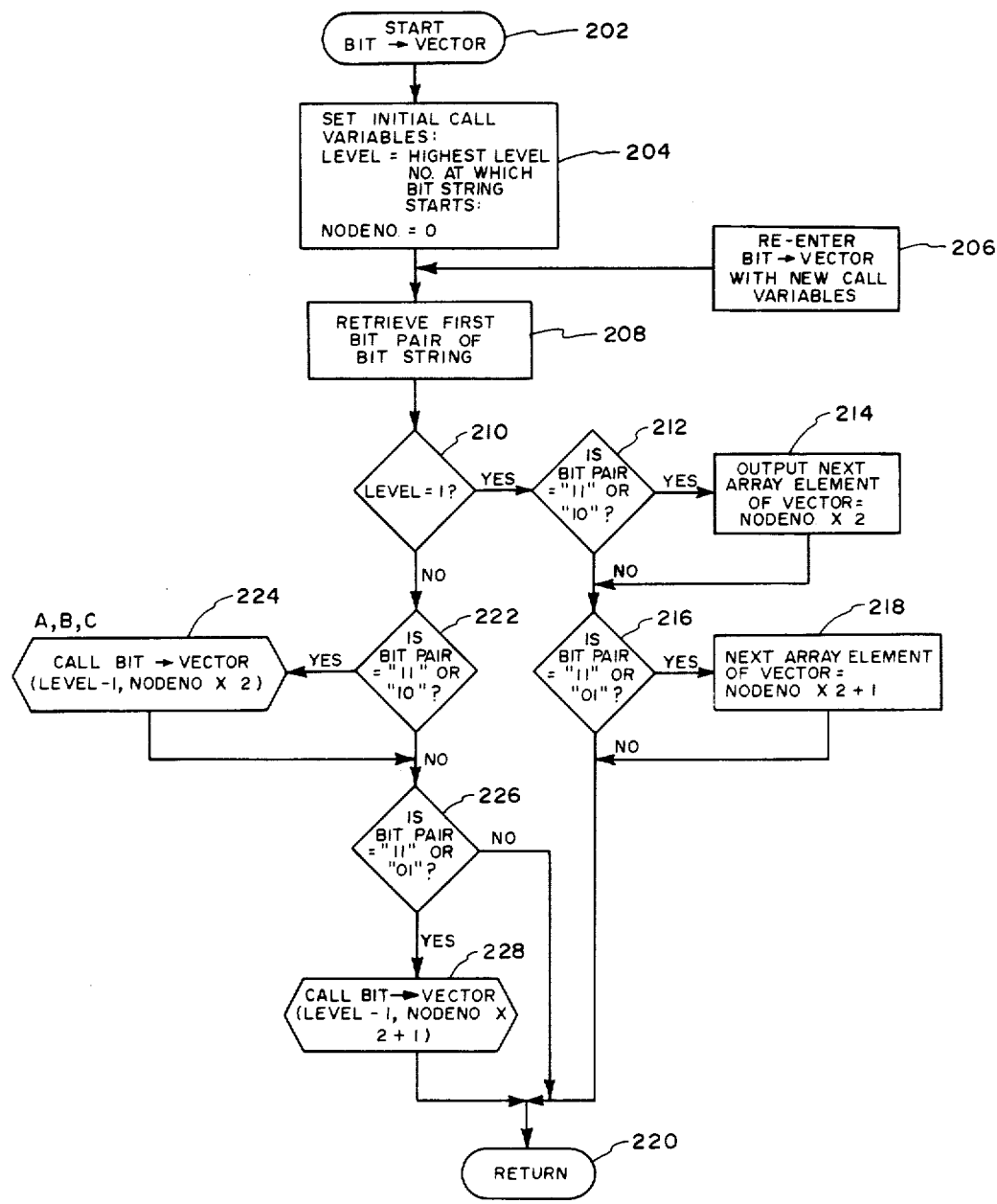
FIG. 6 is a flowchart illustrating one presently preferred embodiment of a method for transforming bit strings back into vectors using the system and method of the present invention.
FIG. 6A is a chart which illustrates one example of how the method of FIG. 6 is used.

Reference is next made to the flowchart of FIG. 6 and the chart of FIG. 6A which illustrate one example of the manner in which a bit string is transformed into a sorted vector. For purposes of illustrating the flowchart of FIG. 6, the bit string for keyword 1 of FIG. 3B will be used.

4. The Method for Transforming A Bit String Into A Vector: FIGS. 6–6A

CPU 12 first retrieves the bit string for keyword 1 and then sends the bit string to the special purpose bit processor 20. Processor 20 calls subroutine 22*b* from the RAM 22 and then proceeds to process the bit string in order to transform it into the vector 36 (see FIG. 3A) for keyword 1.

Referring first to FIG. 6, the subroutine is first initialized at step 202 and then at step 204 the call variables for the subroutine are initialized. The call variables are the level in the hierarchal tree represented by each bit pair of the bit string, and the node numbers represented at each bit pair of the bit string.

Initially the call variable for "level" is set to the highest level number at which the bit string starts, and the variable for the node number (NODENO) is set to 0. The bit processor 20 then proceeds to call each pair of bits in sequence starting from left to right and going from top to bottom through each level and node of the hierarchal tree represented by the bit pairs. In so doing, the processor 20 determines which bit pairs correspond to terminal nodes in the tree. Based on the node number for a terminal node, processor 20 determines the number of the array element (i.e., record) of the vector which is represented by that terminal node.

For example, at step 210 the processor 20 determines whether it has reached a bit pair which is at level 1 and therefore one which represents a terminal node of the hierarchal tree. At that point using steps 212, 214, 216 and 218 the processor 20 determines the node number for that terminal node and then derives the number for the array element corresponding to that terminal node, which is then output as part of the vector for that keyword. If the processor 20 determines at step 210 that it has not reached a terminal node, it continues the left-to-right top-to-bottom sequence of calling each bit pair using steps 222, 224, 226 and 228 until it reaches a point where a terminal node has been found.

A specific example of the above-described method can be understood by reference to the flowchart of FIG. 6 in connection with chart 230 of FIG. 6A. After the bit processor 20 has initialized the subroutine at step 202 and has set the initial call variables at step 204, it retrieves the first bit pair for the bit string, which in this case of keyword 1 will be "10" (see FIG. 3B). Processor 20 then moves to step 210, determines that it has not reached level 1 and moves to step 222 where it determines that the retrieved bit pair is a "10." Processor 20 next moves to step 224 where it sets pending call A and the subroutine is then called again. The call variable for "level" is decremented by one, and the call variable for NODENO" is multiplied by 2. The subroutine is then re-entered at step 206 for the second call, which is indicated in chart 230 on the row for call number 2.

The next bit pair "11" will be retrieved from the bit string at step 208 and the processor 20 will then move through step 210 to steps 222 and 224, where pending call B is recorded and the call variable for "level" is again decremented. The subroutine will then be entered for the third call. The third bit pair "01" will be retrieved at step 208 and the processor will again move through step 210 to step 222. At this point processor 20 determines that the retrieved bit pair is not a "11" of a "10" and moves to step 226. There it determines that the retrieved bit pair is a "01" and then moves to step 228. In step 228 the call variable for "level" will be decremented and "NODENO" will be set to the previous "NODENO" times two, plus one. At this point the new call variables for the fourth call will be as indicated in chart 230 at columns 236*a* and 236*b* as contained in the row for call number 4.

The processor 20 re-enters the subroutine at step 206 and then retrieves the next bit pair which is "01." Since "level" has now reached 1, from step 210 processor 20 will move to step 212. Since the retrieved bit pair is a "01" the processor 20 will move to step 216 and then to step 218 where it will output an array element for the vector 36 of keyword 1. The array element will be equal to "NODENO" times two, plus one. Since "NODENO" is 1, the array element output for the vector will be 3 as indicated at column 240 (FIG. 6A). The processor 20 will then move to step 220 and will return to step 224 where pending call B, which has been recorded in RAM 24, will next be completed.

As indicated above, the sequence for retrieving each bit pair from the bit string is from left to right and from top to bottom for each level and each node number represented in the hierarchal tree. Thus, as can be seen from FIG. 3B and 3D the processor 20 must return to level 3 to begin processing that portion of the bit string which begins at node 1 in level 3. Thus, the pending call B will return the bit processor to step 224 which will then move through step 226 to step 228 and will call the subroutine for the fifth call by decrementing "level" from pending call B (call number 2) and by resetting NODENO to 1. The processor 20 then re-enters the routine at step 206 for the fifth call and retrieves the next bit pair "11."

Processor 20 again moves through step 210 and step 222 to step 224, where it sets the next pending call C, and then resets the call variables and re-enters the subroutine for the sixth call. For call number 6 the next bit pair ("01") is retrieved. Since "level" is now 1, processor 20 moves from step 210 to step 212. Since the retrieved bit pair is a "01" the processor will move to step 216 and then to step 218 where the next array element of vector 36 will be output. Since for call number 6 "NODENO" is 2, the vector array element will be 5 as indicated at column 240 in FIG. 6A. Bit processor 20 then moves to step 220 which returns the processor to RAM 24 to complete pending call C at step 224. Processor 20 then moves to step 226 where it determines that the bit pair for call number 5 was a "11" so processor 20 then moves to step 228 and resets the call variables as indicated.

For call number 7 the call variable for "level" is 1 and "NODENO" is 3. The bit pair corresponding to that level and node number is then retrieved, which in this case is "01" (see FIGS. 3B and 3D). Processor 20 then moves to step 210 where it determines that since it has reached level 1 it has again identified a terminal node so it passes to step 212. Since the retrieved bit pair was a "01" processor 20 moves to step 216 and then to step 218 where the last array element of vector 36 for keyword 1 is output. Processor 20 then moves to step 220 and returns to complete the last pending call, which was pending call A at step 224. Processor 20 moves to step 226 from step 224 and since the retrieved bit pair for call number 1 was a "10", processor 20 will move from step 226 to step 220 where it will determine that all pending cals have now been completed signifying that the vector for keyword 1 has been completed. Processor 20 then returns the vector to CPU 12 which stores it in the vector work file 16c.

As will be appreciated from chart 230 (FIG. 6A), each pending call which is set at step 224 (FIG. 6) must be completed at some point by a later call. As illustrated in chart 230, pending call A which was set for call number 1 is completed by call number 8. Similarly pending call B which is set during call number 2 is completed by call number 5, and pending call C which was set during call 5 was completed by call number 7.

5. The Method for the "AND" Operation: FIGS. 7A-7H:

Reference is next made to FIGS. 7A-7D which illustrate the flowcharts used by bit processor 20 to implement a logical "AND" operation with respect to the bit strings retrieved from the index 18b. FIGS. 7E-7H are charts which are used to illustrate the method embodied in the flowcharts of FIGS. 7A-7D, using as an example for the bit string for keyword 1 (FIG. 3B) "AND" the bit string for keyword 2 (FIG. 3C).

To more fully understood the example in question, reference is first made to FIGS. 3B-3D. FIGS. 3B and 3C illustrate the bit strings for keyword 1 and keyword 2 as well as illustrating the level and node of hierarchal tree 26 which are represented by each bit pair of each bit string. Briefly summarized, when merging the bit strings for keyword 1 and keyword 2 using a logical "AND" operation, the bit pairs for each bit string are retrieved beginning from left to right and from top to bottom at each level and node represented by the bit pairs. At each level and node where a bit pair for both bit strings is present, the bit pairs are processed using the "AND" operation to output a new bit pair which forms part of the resultant bit string representing the joined keywords. At each level and node where a bit pair is present for only one of the bit strings, no output is generated and the retrieved bit pair is simply skipped.

The result which is obtained using this method is illustrated in FIG. 3D by the triangle symbol, which shows the paths represented by the resultant bit string. As will be appreciated from FIG. 3A, the only common array element found in the vectors for keywords 1 and 2 is array element 7, which is identified by the path marked with the triangle symbol in the hierarchal tree 26 of FIG. 3D.

As generally illustrated in FIG. 7E, in the example for keyword 1 "AND" keyword 2, at level 4 and node 0 (see FIGS. 3B-3D) a bit pair from each keyword is present. Thus, the first bit pair "10" of keyword 1 is merged with the first bit pair "11" of keyword 2, as indicated at the lines connecting the bits for those two bit pairs. The result is the first bit pair 337a which is output for the resultant bit string.

Proceeding from left to right and from top to bottom, at level 3 node 0 again a bit pair for both bit strings is present and so the "11" and "01" bit pairs are merged using the "AND" operation resulting in the next bit pair 337b of the resultant bit string. At level 2 node 0 and at level 1 node 1 only a bit pair for the bit string of keyword 1 is present, so those bit pairs are skipped as schematically indicated in FIG. 7E.

Returning then to level 2 node 1 (see FIGS. 3B-3D), continuing with the left-to-right and top-to-bottom retrieval of bit pairs, another bit pair for each bit string is present. The "AND" operation is applied to the bit pairs "11" for keyword 1 and "01" for keyword 2, as schematically indicated by the lines joining the bits for those bit pairs. The result of the "AND" operation is the third bit pair 337c output for the resultant bit string. The next bit pair in the sequence is a bit pair from keyword 1 at level 1 node 2, which is skipped as indicated in FIG. 7E.

At the next level and node in the sequence, which is level 1 and node 3, againa bit pair for each keyword is present. Using the "AND" operation the last bit pair 337d is output for the resultant bit string. The remaining bit pairs which are retrieved occur only in connection with keyword 2 and are therefore skipped as shown.

Figure 7A:
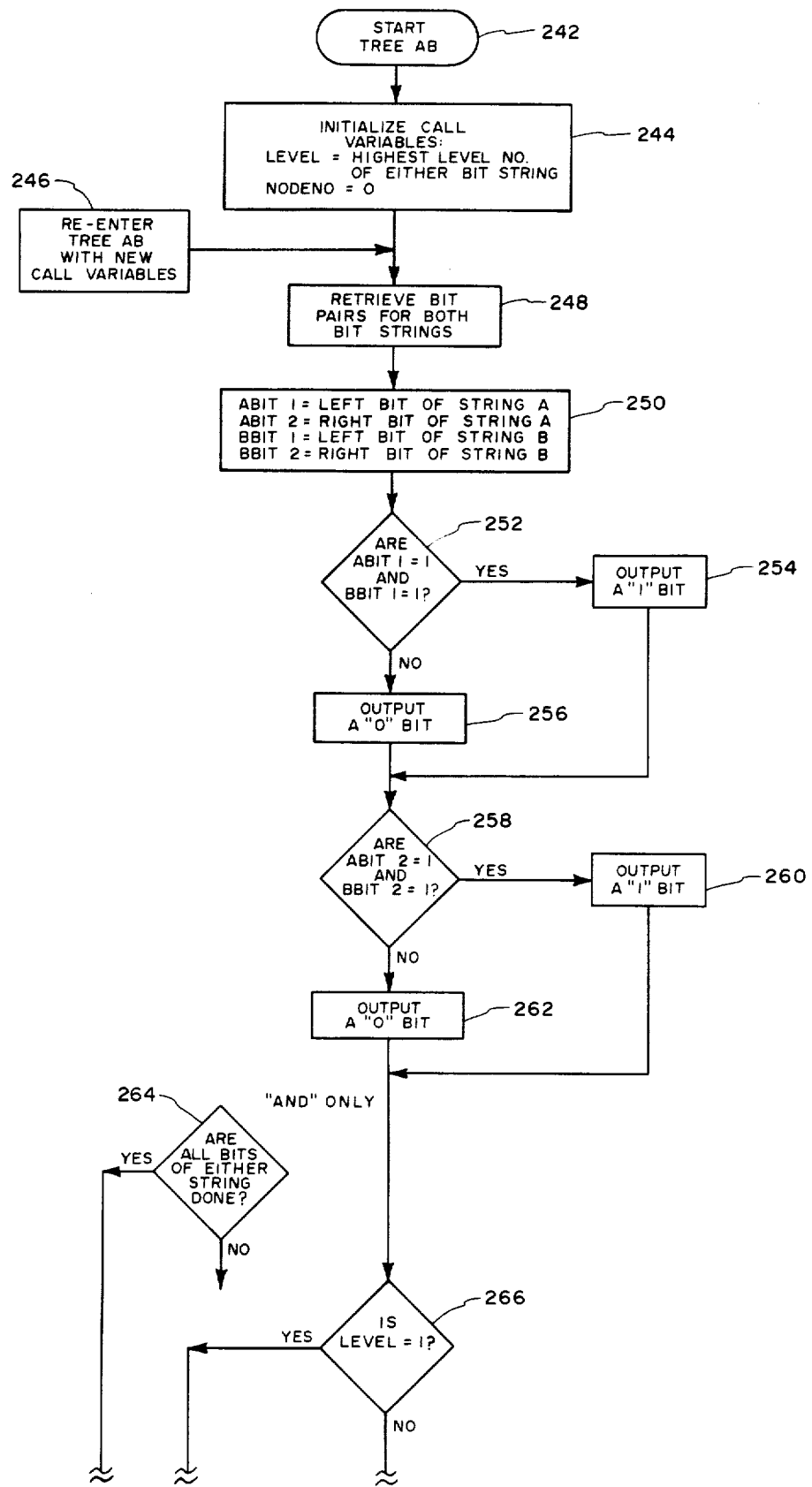
FIGS. 7A-7D are flowcharts illustrating one presently preferred embodiment for performing a logical "AND" operation using the system and method of the present invention.

One specific manner of implementing the method as generally described above is shown in the flowcharts of FIGS. 7A-7D, which can be best understood in combination with the charts shown at FIGS. 7F-7H. the subroutine illustrated in FIGS. 7A-7D for performing the "AND" operation as described above is a recursive routine which is re-entered each time the call variables for the routine are changed. By changing the call variables as hereinafter more fully described, processor 20 will retrieve and process each bit pair in the left-to-right top-to-bottom sequence described above.

As shown in FIGS. 7A and 7F-7H, the call variables consist of the variable for "level" and for "NODENO." These call variables indicate the level and node represented by each retrieved bit pair. When the CPU 12 receives a command instructing it to join two keywords using the "AND" operation, the bit strings for those keywords are retrieved by CPU 12 and then sent to processor 20. Processor 20 then calls the subroutine 22c from ROM 22 which is thereby initialized as indicated at step 242 of FIG. 7A. Processor 20 then initializes the call variables, setting "level" to the highest level number of either bit string, and setting "NODENO" to 0, as indicated at step 244. Processor 20 next moves to step 248, begins the first call (see also FIG. 7F) by retrieving the bit pairs for both bit strings at the initial level and node indicated by the call variables. Thus, as shown in FIG. 7F for bit string A of keyboard 1, the bit pair "10" will be retrieved and for bit string B of keyword 2, the bit pair "11" will be retrieved as indicated at columns 346a and 346b in chart 338 (FIG. 7F).

After retrieving the bit pairs for both bit strings as indicated at step 248 (FIG. 7A), processor 20 moves to step 250 where it sets several flags. The flag "ABIT1" is the left bit of the bit pair retrieved for bit string A, and the flag "ABIT2" is the right bit of the bit pair retrieved for bit string A. Similarly, the flags for "BBIT1" and "BBIT2" are the left and right bits of the bit pair retrieved for bit string B.

After the flags have been set at step 250, processor 20 then checks at step 252 to determine whether "ABIT1" and "BBIT1" are both 1. For the first call both flags are 1, and processor 20 moves to step 254 and outputs a "1" bit. Processor 20 then moves to step 258 and checks whether "ABIT2" and "BBIT2" are both 1, and determines that for call number 1 they are not. Processor 20 moves to step 262 and outputs a "0" bit. Thus, steps 252-262 are used to perform the "AND" operation on the retrieved bit pairs. As shown in FIG. 7F at 348a, the result is the first bit pair "10" which is output for the resultant bit string.

Figure 7B:
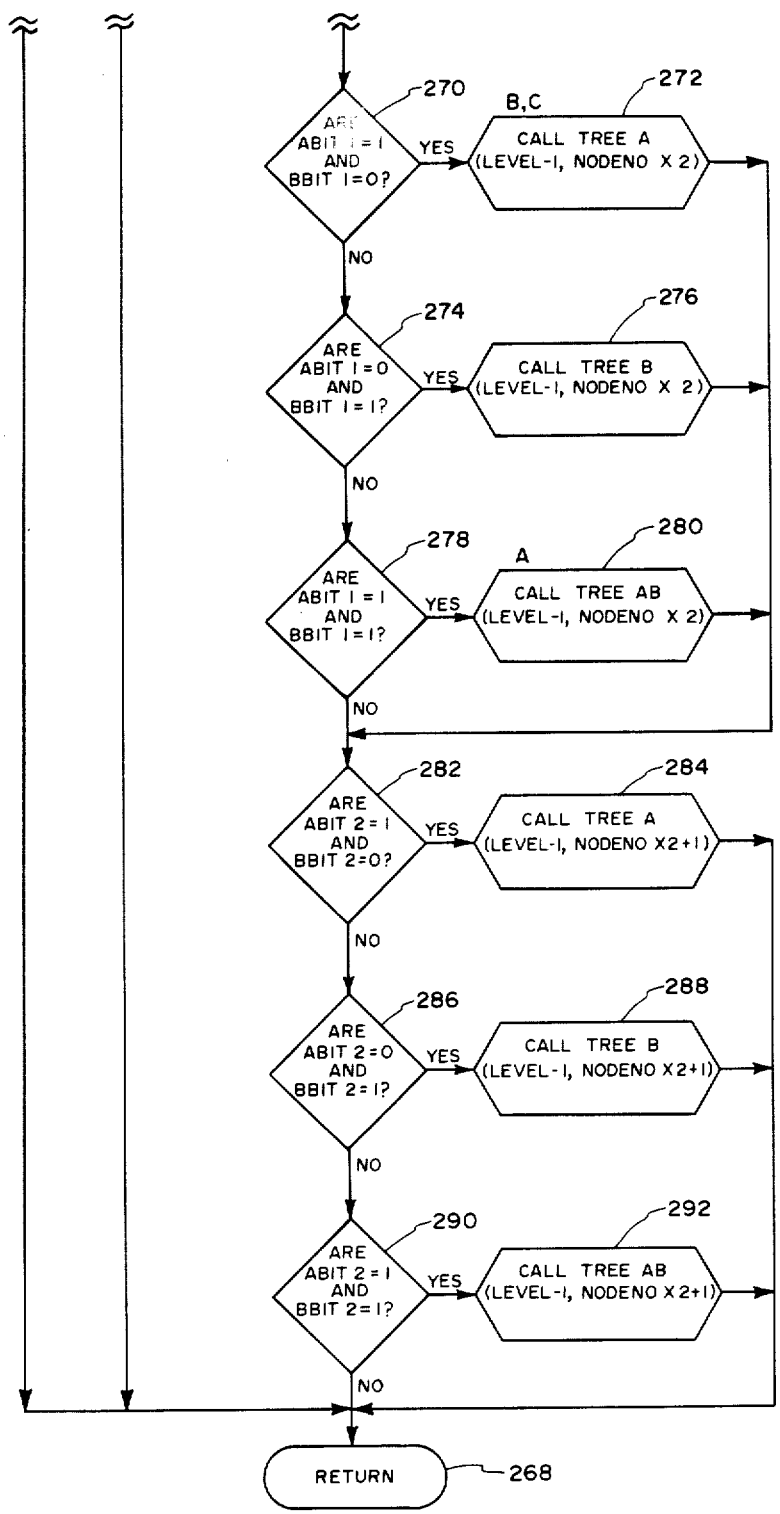

Processor 20 then continues at step 266 and checks to determine whether it has reached level 1. Since for the first call the call variable for "level" is 4, processor 20 moves to the next step 270, which is illustrated in FIG. 7B. In the remaining steps the processor 20 determines whether at the next level and node which occur in the sequence a bit pair from each bit string is present or whether a bit pair from only one of the bit strings is present. These steps therefore determine whether the bit pairs for the bit strings are skipped, as in the case where only a single bit pair from one of the bit strings is present, or whether to "AND" the bit pairs from each bit string in the case where bit pairs from both bit strings are present.

At step 270 in FIG. 7B, processor 20 first determines whether "ABIT1" and "BBIT1" were set to 1 and 0 respectively. Since for call number 1 they were both set to 1, the processor 20 will move from steps 270, 274 and 278 to step 280. At step 280 processor 20 will decrement the call variable for "level" by one, and then will reset "NODENO" by multiplying its previous value by two. From step 280 processor 20 re-enters the TREEAB subroutine at step 246 (FIG. 7A) with the new call variables as indicated in chart 338 of FIG. 7F. Steps 248-262 are then repeated as before, retrieving the next bit pair from each bit string which occur at level 3 and node 0. The "AND" operation is performed on the corresponding bits of each retrieved bit pair, outputting the next bit pair 348b for the resultant bit string (FIG. 7F).

Processor 20 next checks at step 166 and determines that it has not yet reached level 1 so it moves to step 270 of FIG. 7B. Since ABIT1 and BBIT1 for call number 2 are a "1" amd 0 bit respectively, processor 20 will move from step 270 to step 272. At step 272 processor 20 will decrement the call variable "level" and will reset "NODENO" as indicated. These new call variables are then used to call the subroutine for "TREEA" which indicates that the next bit pair which is retrieved at the next level and node in the sequence does not have any corresponding bit pair from keyword 2.

Figure 7C:
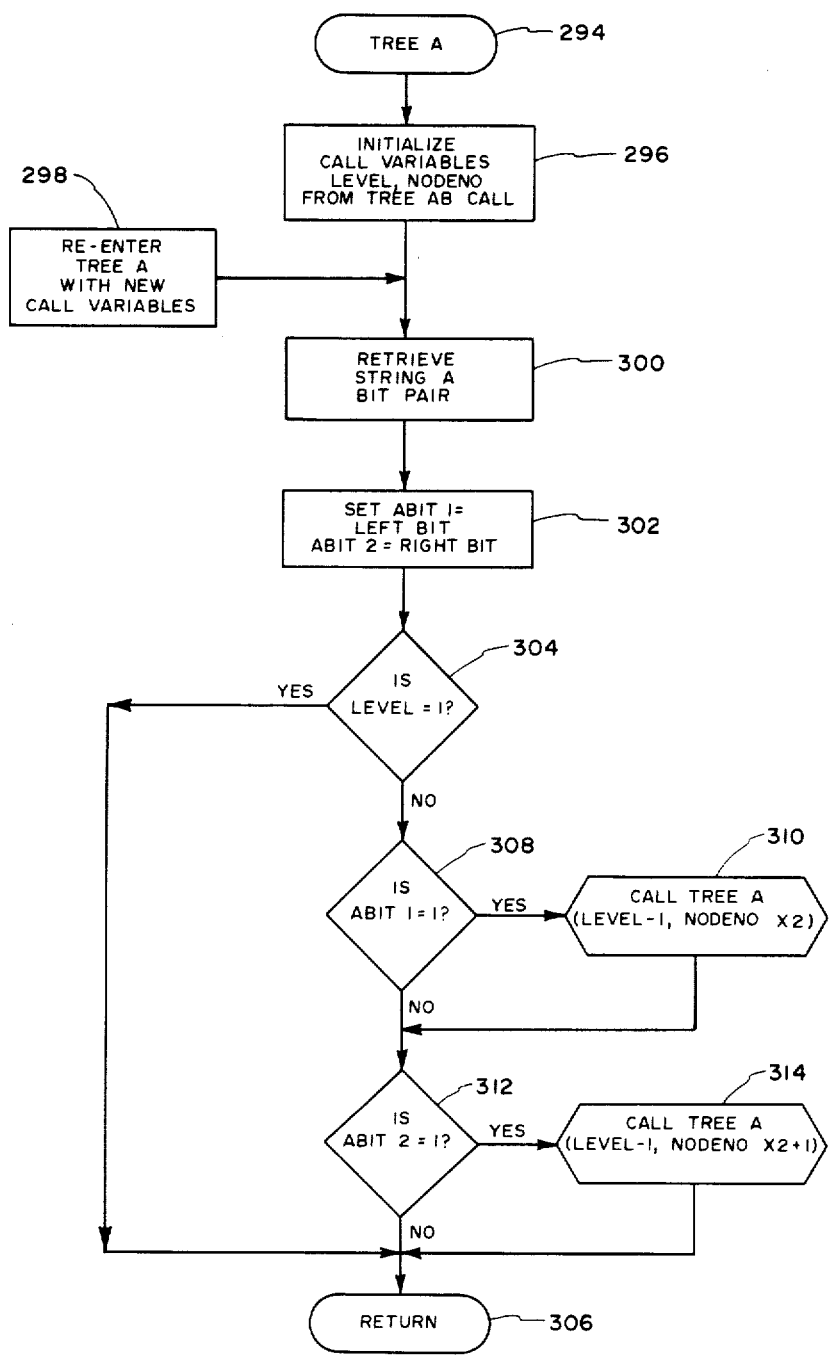

The subroutine for TREEA is illustrated in FIG. 7C, and corresponds to chart 351 of FIG. 7G. As indicated in chart 351, the third call causes processor 20 to enter the subroutine for TREEA and initializes the subroutine at step 294 and then sets the call variables at step 296 to the values which were determined at step 272. Processor 20 then retrieves at step 300 the next bit pair for bit string A, which is a "01." The flags "ABIT1" and "ABIT2" are set equal to the left and right bit of the bit pair as indicated at step 302. Processor 20 then moves to step 304 and determines whether it has reached the first level. Since for call number 3 the level was set at 2, processor 20 moves to step 308.

At step 308 processor 20 will determine that "ABIT1" was set to 0 and will move next to step 312 where it will determine that ABIT2 was set to 1. Processor 20 will then move to step 314 which will result in the next call, call number 4 as indicated in the chart 351 of FIG. 7G. The call variable "level" will be decremented by 1, "NODENO" will be reset by multiplying its previous value by two and then adding one. Processor 20 will then re-enter the TREEA subroutine at step 298 for call number 4.

As shown in the chart 351 of FIG. 7G, and the retrieve bits for bit string A will be "01." Thus, after moving through steps 300 and 302, processor 20 will move to step 304 and will detect that it has reached the first level, and will then move to step 306 causing the processor 20 to return and to complete any pending calls which were previously stored in RAM 24.

As indicated in column 340 in the chart 338 of FIG. 7F, pending calls will have been set at steps 280 and 272 during both call number 1 and call number 2. Thus, processor 20 next returns to step 272 to complete the pending call B. Processor 20 therefore moves next to step 282 in the TREEAB subroutine (FIG. 7B) where it checks the "ABIT2" and "BBIT2" flags which were set during call number 2. Since "ABIT2" and "BBIT2" are both 1, processor 20 will move through steps 282 and 286 to step 290 where it will then call the TREE AB routine at step 292, decrementing the call variable for "level" from 3 to 2 and resetting NODENO to 1.

For call number 5 as indicated in chart 338 of FIG. 7F, at level 2 and node 1 processor 20 will retrieve the bit pair "11" for bit string A and "01" for bit string B. Processor 20 then moves from step 248 (FIG. 7A) to step 250 where it sets the flags indicated in that step then moves through steps 252-262 in the same manner as previously indicated so as to "AND" the retrieved bit pairs. The result of the "AND" operation is the third bit pair 348c which is output for the resultant bit string as indicated in FIG. 7F.

Processor 20 then moves from step 266 to step 270 (FIG. 7B) where it determines that the flags for "ABIT1" and "BBIT1" represent a "10," causing the processor 20 to next move to step 272. As indicated in chart 338 at column 340, during call number 5 pending call B has now been completed and a new pending call C is recorded at step 272. The call variables are then changed as indicated at step 272 and processor 20 calls the TREE A routine.

For call number 6 as shown in chart 351 of FIG. 7G, the call variables for "level" and "NODENO" are set at 1 and 2, respectively. Processor 20 moves from step 296 (FIG. 7C) to step 300 where it retrieves the next bit pair for bit string A, which is a "01." Since there is no corresponding bit pair from bit string B the bit pair is simply skipped as indicated in chart 351, and processor 20 determines at step 304 that level 1 has been reached and returns to step 306.

At step 306 processor 20 again checks RAM 24 to determine whether all pending calls have been completed, and returns to step 272 to finish pending call C. Accordingly, processor 20 moves from step 272 (FIG. 7B) through steps 282, 286 and 290 where it determines that the flags for "ABIT2" and "BBIT2" were set to "11" during call number 5, therefore moving the processor 20 to step 292 for call number 7, which will complete pending call C.

For call number 7, processor 20 re-enters TREE AB at step 246 (FIG. 7A) and retrieves the next bit pair for each bit string at step 248, then resets each of the flags at step 250. The retrieved bit pairs are then merged using the "AND" operation so as to output the last bit pair 348d (see FIG. 7F) for the resultant bit string. The "AND" operation is performed using steps 252-262 as previously described in FIG. 7A. Processor 20 then moves to step 266 where it determines that it has reached the first level so processor 20 then moves to step 268 (FIG. 7B) which is a return instruction. Processor 20 thus checks the RAM 24 to complete any pending calls that were previously set and moves back to step 280 to complete pending call A. From step 280 processor 20 again checks the flags for "ABIT2" and "BBIT2" which were set during call number 1. Thus, processor 20 will move from step 282 to step 286 where it will determine that "ABIT2" equals 0 and "BBIT2" equals 1, thus moving processor 20 to step 288.

Figure 7D:
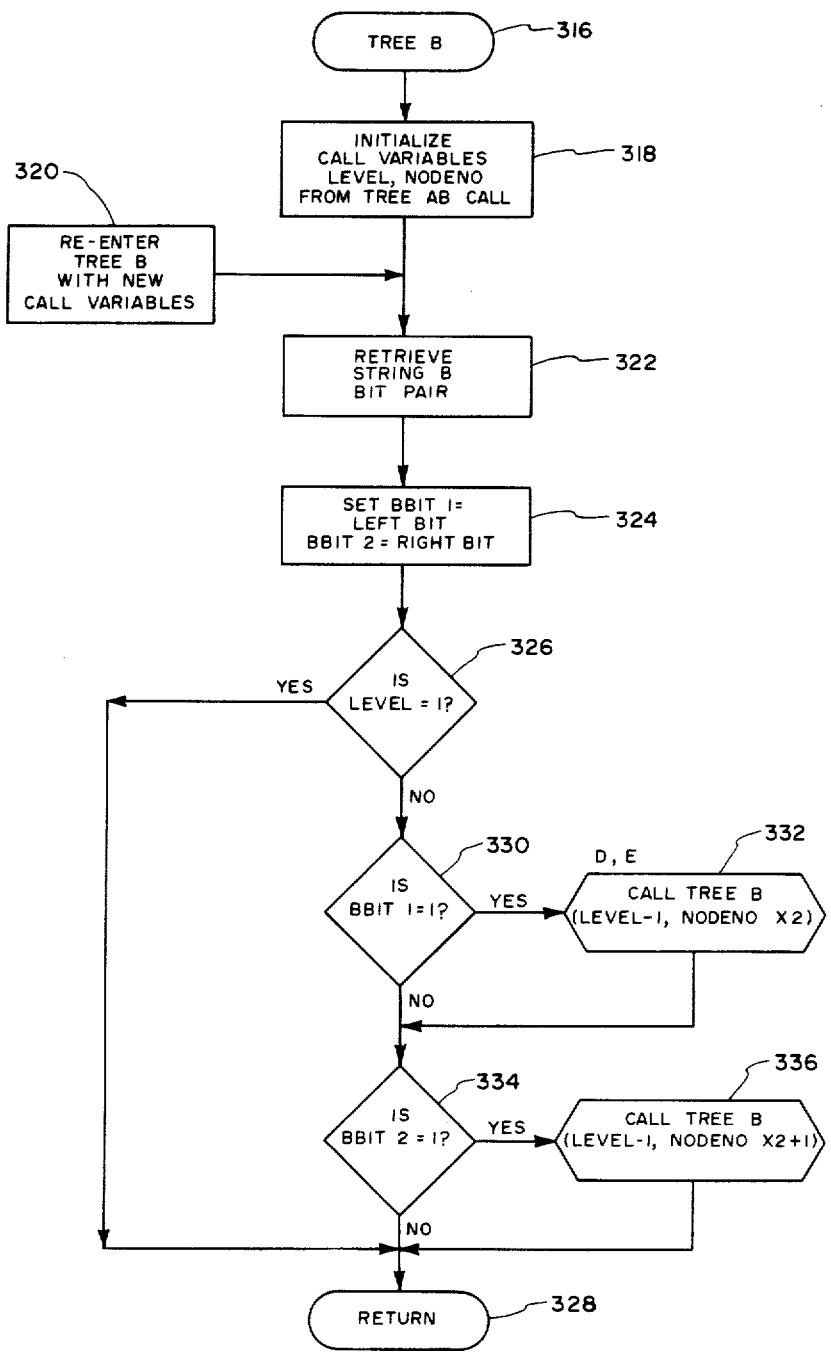

At step 288 processor 20 will call the subroutine for TREE B which signifies that at the next level and node in the sequence only a bit pair from bit string B of keyword 2 is present. Processor 20 thus moves to step 316 of the TREE B subroutine as illustrated in FIG. 7D. The routine is initialized and the call variables are set at step 318 to the next level and node in the sequence as indicated in chart 363 of FIG. 7H. Processor 20 then moves to step 322 and retrieves the next bit pair for bit string B of keyword 2. The flags for the bit pair are set as indicated at step 324 and processor 20 then moves to step 326 to check whether it has reached the first level. Since it has not it moves to steps 330 and 334 to check the "BBIT1" and "BBIT2" flags. Since the retrieved bits for call number 8 are "11" as indicated at column 368 of chart 363, "BBIT1" and "BBIT2" will both be set to 1. Accordingly, at step 330 processor 20 will detect that the first flag is 1 and will then move to step 332, setting a pending call D and re-entering the TREE B subroutine at step 320 with the new set of call variables which are determined at step 336.

For call number 9 processor 20 then retrieves the next bit pair "01" from the bit string B for keyword 2. The flags are reset at step 324 and processor 20 then drops through step 326 to steps 330 and 334 where it checks the flags and determines that the flag for "BBIT2" is 1. Processor 20 then resets the call variables at step 336 and re-enters the TREE B subroutine at step 320 for call number 10.

The processor 20 continues in this fashion calling the remainder of the bit pairs for bit string B of keyword 2 detecting that at each level and node which remains in the sequence only the bit pairs for bit string B are present, thus skipping the output as indicated in chart 363. Upon completion of the sequence the processor 20 returns the completed resultant bit string indicated at 348 in chart 338 (FIG. 7F) to CPU 12, where the bit string is then stored in file 16b. The resultant bit string can then be sent back to the processor 20 and transformed into a vector which will contain the record numbers of each record where keyword 1 "AND" keyword 2 are contained. In the above example, the only record containing both keywords is record number 7, (see FIG. 3A) so the vector for keyword 1 "AND" keyword 2 will only contain a single array element, as shown in FIGS. 7E and 3D.

It should also be noted that bit string A and bit string B for keyword 1 and keyword 2, respectively, do not contain the same number of bit pairs. Accordingly, when the shortest bit string has been completed there will no longer be the possibility of any level or node where bit pairs for both bit strings would be present. Therefore, the method for processing the retrieved bit pairs can be simplified in FIG. 7A by simply inserting after step 262 a step 264 which requires the processor 20 to determine whether all bit pairs of either bit string have been done. If so, processor 20 can then move directly to step 268 (FIG. 7B) where it will determine that no further output for the resultant bit string will be required. This would result in simplifying the method so that in the case of the example described above, all of the calls which occur after call 7 would be omitted. Thus, in the above-described example there would be no need to go through each of the calls presented in chart 363 (FIG. 7H) However, for purposes of illustrating the use of the flowchart for TREE B step 264 of FIG. 7A was not initially included in the preceding description. However, it should be understood that normally step 264 would be included since it simplifies the method in many cases.

6. The Method for the "OR" Operation: FIGS. 8A-8H

Reference is next made to the flowcharts of FIGS. 8A-8D which illustrate the method used for implementing a logical "OR" operation when combining retrieved bit strings. Reference is also made to FIGS. 8E-8H which illustrate charts used to explain an example of how the flowcharts of FIGS. 8A-8D operate. The example which is used employs the bit strings for keyword 1 and keyword 2 which are shown at FIGS. 3B-3D. Specifically, in the example it will be shown how the flowcharts of FIGS. 8A-8D combine the bit strings for keyword 1 and keyword 2 so as to produce a resultant bit string that represents keyword 1 "OR" keyword 2.

Briefly summarized, in the method for implementing the "OR" operation the bit processor 20 moves in sequence from each level and node represented by the bit pairs, going from left to right and from top to bottom. The bit processor 20 checks at each level and node in the sequence to determine whether a bit pair for each bit string is present. If so, the bit processor 20 performs the "OR" operation on the retrieved bit pairs and outputs the result as a new bit pair used in the resultant bit string. At each level and node in the sequence at which a bit pair for only one of the bit strings is present, the bit pair is simply copied and output. Thus, the resultant bit string contains each new bit pair resulting from an "OR" operation at a level and node where the bit pairs for both bit strings are present, as well as the bit pair at each level and node where only a bit pair from one bit string is present.

The method as briefly summarized above is generally illustrated in FIGS. 3D and 8E. In FIG. 3D the square symbol appears at each level and node where one of the bit pairs of the resultant bit string occurs. By tracing the square symbol, the paths represented by the resultant bit string lead to the records which are contained in either keyword 1 "OR" keyword 2. As can be seen from FIGS. 3A and 3D, the records so identified include records, 3, 5, 6, 7, 10, 11 and 12. Thus, the vector for the resultant bit string would include each of those records, as indicated in FIG. 8E.

FIG. 8E also generally illustrates the sequence in which the bit pairs for the resultant bit string are generated using the above-described method. At the first two levels and nodes in the sequence bit pairs for both bit strings are present which are then merged using the "OR" operation so as to output bit pairs 373a and 373b of the resultant bit string. The next two bit pairs which are retrieved in the sequence are from bit string A. Since no corresponding bit pairs exist for bit string B, those bit pairs are simply copied into the resultant bit string as indicated at 373c and 373d. At the next level and node in the sequence bit pairs for both bit strings are retrieved and are merged using the "OR" operation so as to output bit pair 373e. The next bit pair retrieved is present only in connection with bit string A, so it is copied and output as bit pair 373f. At the next level and node in the sequence bit pairs for both bit strings are present and so they are merged using the "OR" operation so as to output bit pair 373g. The last five bit pairs from bit string B which are retrieved in sequence do not have any corresponding bit pair from bit string A at those levels and nodes and so they are simply copied in the resultant bit string as indicated at 373h–373l.

Figure 8A:
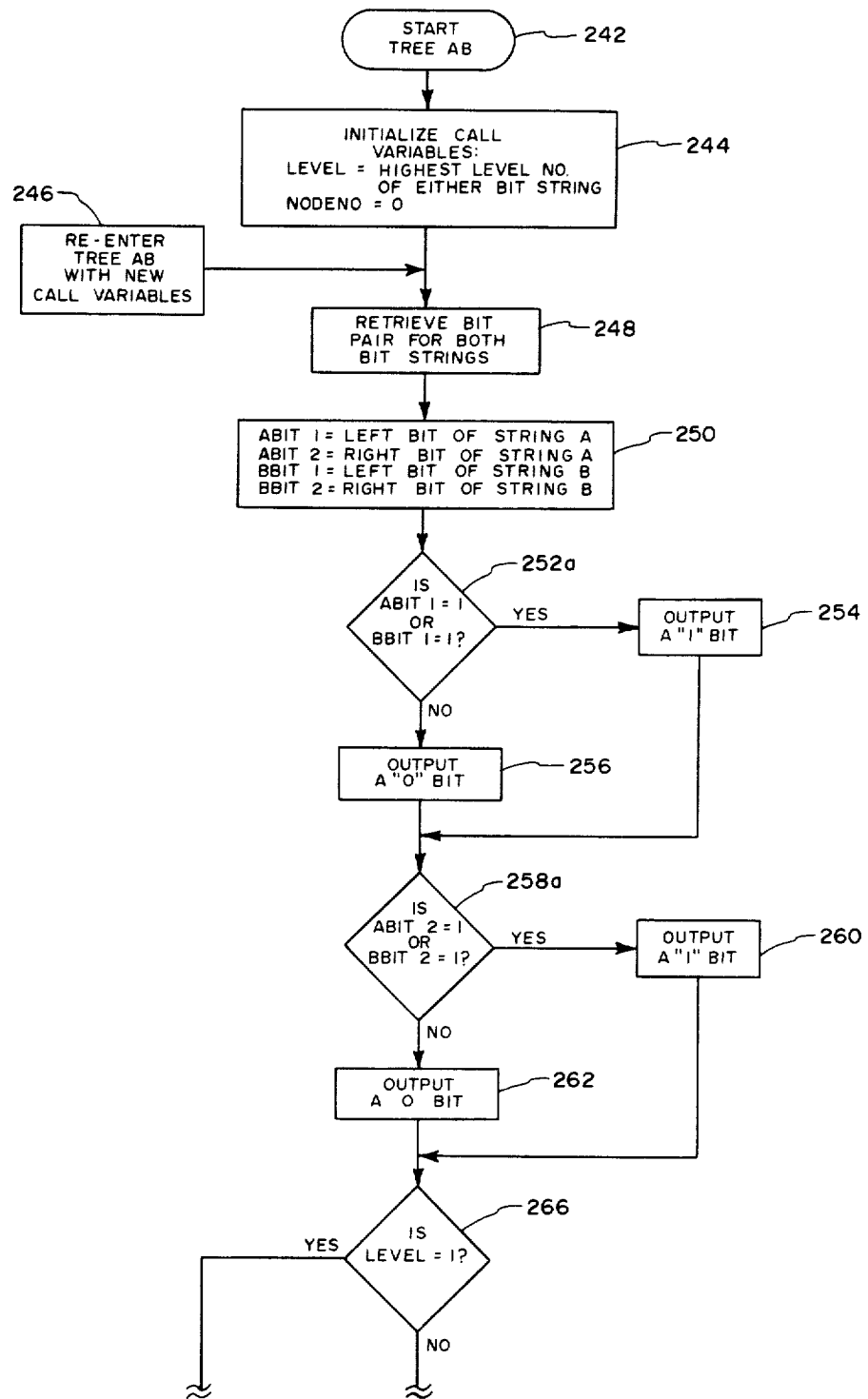
FIGS. 8A-8D are flowcharts illustrating one presently preferred embodiment of a method for performing a logical "OR" operation in accordance with the system and method of the present invention.

The flowchart for implementing the above-described method as illustrated in FIGS. 8A–8D and as explained using the above example in connection with charts 374, 388 and 402 of FIGS. 8F–8H correspond closely to the flowcharts and the example previously described in connection with FIGS. 7A–7D and 7F–7H. In particular, in FIG. 8A there are only three differences between the flowchart in FIG. 7A with that which is shown in FIG. 8A. At steps 252a and 258a in FIG. 8A, each flag is checked in the alternative to determine whether it was set equal to 1 in step 250, rather than requiring that in each step both flags be set to 1. This change results in causing the processor 20 to perform a logical "OR" operation rather than a logical "AND" operation where the retrieved bit pairs for each bit string are present at the same level and node. Also in FIG. 8A it should be noted that there is no step which corresponds to step 264 of FIG. 7A. It will be recalled that while performing the "AND" operation once all bit pairs have been completed for the shortest bit string, any remaining bit pairs for the longer bit string may be skipped. However, when performing the "OR" operation whenever a bit pair is present at a level and node without any corresponding bit pair from the other bit string, the retrieved bit pair at that level and node are copied into the resultant bit string rather than being skipped.

Figure 8B:
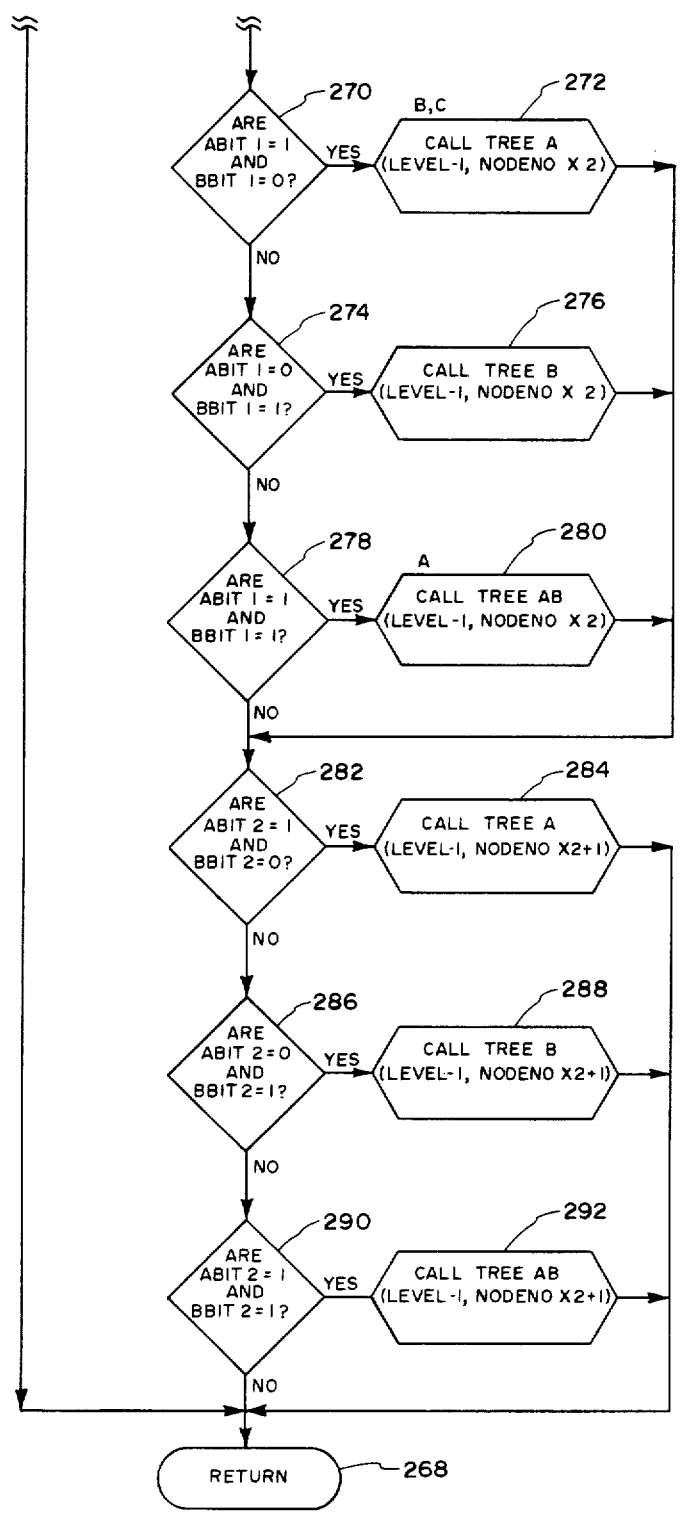
Figure 8C:
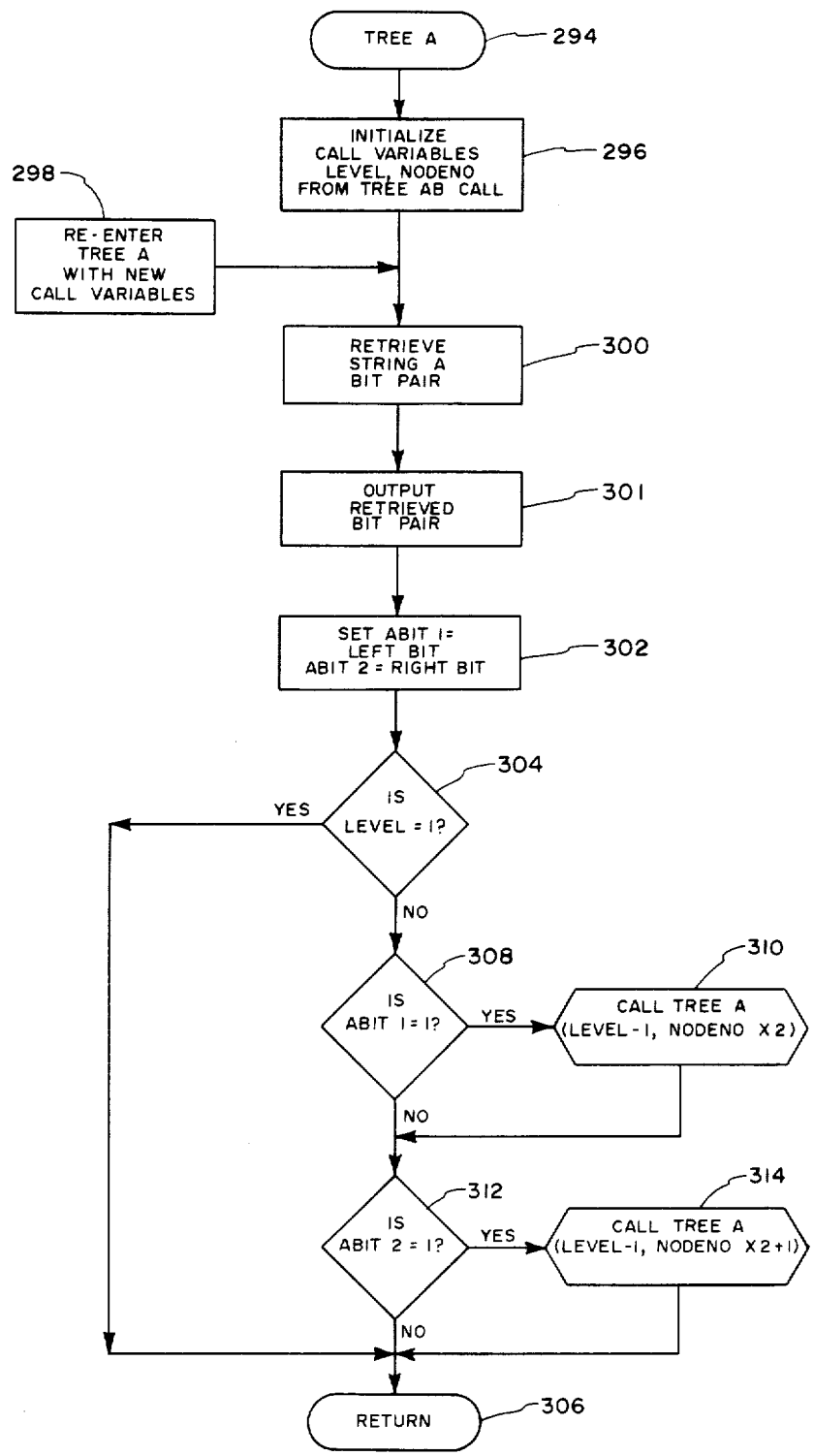
Figure 8D:
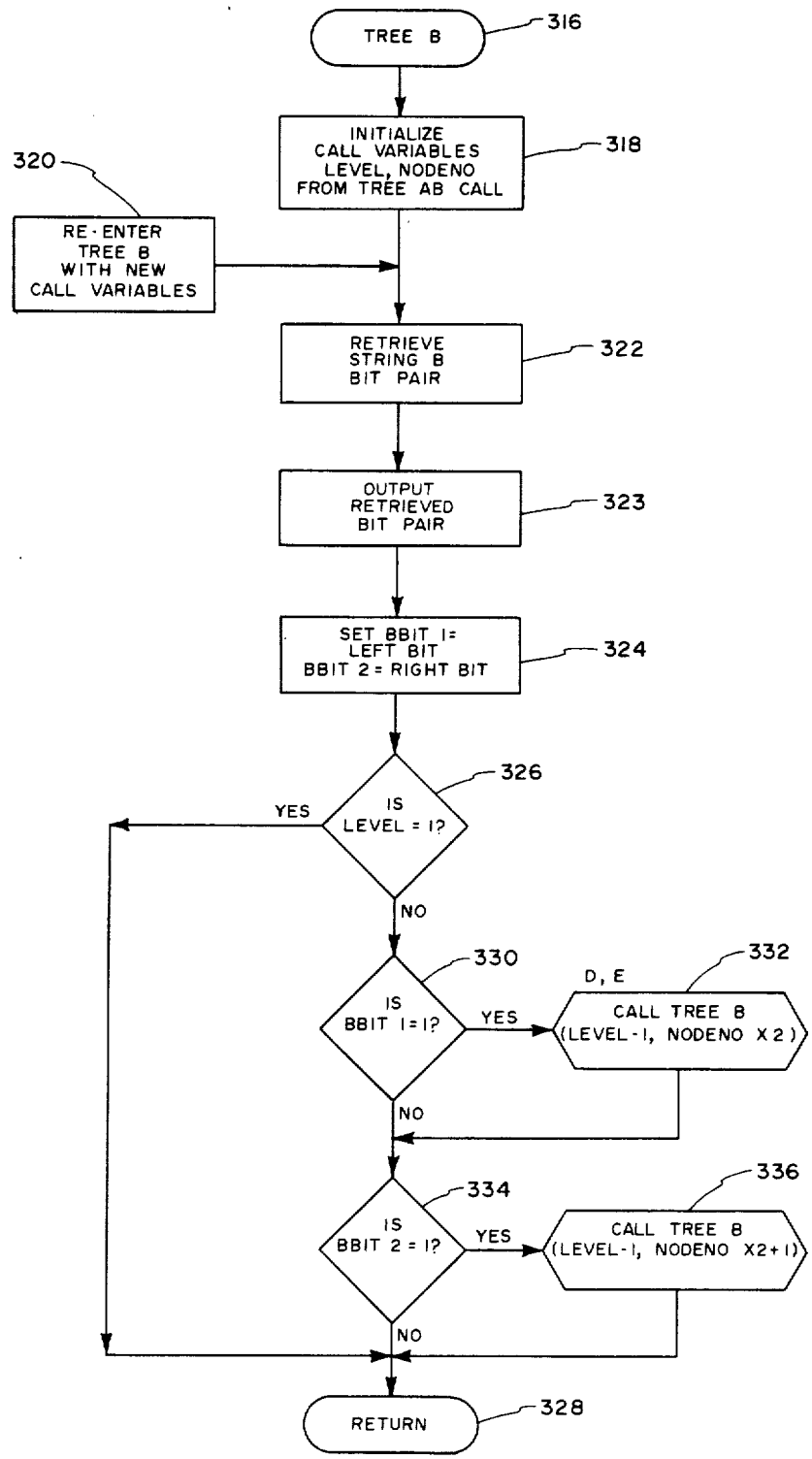

The only other differences with respect to the flowcharts of FIGS. 7A–7D and 8A–8D occur at step 301 in FIG. 8C and at step 323 in FIG. 8D. At steps 301 and 323 processor 20 is outputs the retrieved bit pair in the case where only a bit pair from either string A or string B is present at the level and node in question. Thus, rather than skipping the bit pair as in the case of the "AND" operation a bit pair will be copied into the resultant bit string by virtue of the steps 301 or 323.

With respect to the charts shown in FIGS. 8F–8H, for the example where the bit string A for keyword 1 "OR" the bit string B for keyword 2 is used, the sequence for each call and for each pending call as well as the call variables and retrieved bits will be the same in each of the charts for FIGS. 8F–8H as in the case for the charts of FIGS. 7F–7H. The only difference in the charts of FIGS. 8F–8H is that the retrieved bit pairs in chart 374 are combined using the logical "OR" operation rather than the "AND" operation, and in the case of the charts 388 of FIG. 8G and 402 of FIG. 8H, each retrieved bit pair is copied rather than skipped. Thus, the bit pairs 373a–373l are output for each call number as indicated in the charts 374, 388 and 402 in the sequence there illustrated so as to form the resultant bit string 373 (FIG. 8H).

7. The Method for the "NOT" Operation: FIGS. 9A–9J

Reference is next made to FIGS. 9A–9D which illustrate flowcharts for implementing one presently preferred method for performing a logical "NOT" operation on a pair of retrieved bit strings in accordance with the system andmethod of the present invention. Reference is also made to FIGS. 9E–9J which are used for purposes of illustrating an example of how the method described in the flowcharts of FIGS. 9A–9D is implemented to perform the "NOT" operation. In the example which is used in FIGS. 9E and 9H–9J, the bit string for keyword 1 of FIG. 3B is merged with the bit string for keyword 2 of FIG. 3C so as to form a resultant bit string which represents keyword 1 "NOT" keyword 2.

The paths through the hierarchal tree 26 of FIG. 3D which are represented at each level and node by the bit pairs of the resultant bit string are traced using the circle symbol. Thus, each bit pair of the resultant bit string illustrated in FIG. 9E represents a particular level and node as illustrated by the circle symbol in the hierarchal tree 26 of FIG. 3D.

When performing the logical "NOT" operation, the processor 20 outputs a resultant bit string which contains each record number in which keyword 1 appears except for those record numbers in which keyword 2 also appears. Thus, as will be seen from FIGS. 3A and 3D, performing the logical "NOT" operation on keyword 1 "NOT" keyword 2 will result in a bit string which identifies records 3 and 5 at the terminal nodes of the hierarchal tree 26. Note that since record number 7 in the vector for keyword 1 (FIG. 3A) is also contained in the vector for keyword 2, that record is deleted as a result of the "NOT" operation.

The truth tables representing the binary logic used to implement this operation are illustrated in FIGS. 9F and 9G. As shown at FIG. 9F, when the retrieved bit pairs represent a non-terminal node in the hierarchal tree, the resulting bit pair which is output by performing the "NOT" operation is the same as the bit retrieved from the first, or "A" bit string. As shown in FIG. 9G, when the retrieved bit pairs for the two bit strings represent a terminal node, the "NOT" operation outputs a "1" bit only in the case where the bit pair of bit string A has a "1" bit and the corresponding bit of the bit pair of bit string B is a "0." In every other case the output will be a "0" bit.

Briefly summarized, the method for performing the logical "NOT" operation requires the bit processor 20 to start at the highest level represented by either bit string. Moving from left to right and from top to bottom, each bit pair of each bit string is retrieved. For each level and node where bit pairs from both retrieved bit strings are present, the "NOT" operation is performed as described in connection with FIGS. 9F and 9G. Thus, for non-terminal nodes the bit pair for the first bit string retrieved is copied into the resultant bit string. Where the bit pairs are present at a terminal node the output is determined as described in connection with FIG. 9G above. At each level and node where only one bit pair of one of the bit strings is present, if the bit pair is from the first bit string retrieved then the bit pair is copied and output as part of the resultant bit string. At each level and node where a bit pair from the second bit string retrieved is the only bit pair present, the bit pair is skipped so that no output is generated for the resultant bit string.

The method for the logical "NOT" operation as summarized above is generally illustrated in FIG. 9E. As can be seen from reference to FIGS. 3B-3D and FIG. 9E, at level 4 and node 0 the bit pairs "10" and "11" are retrieved and are merged using the logical "NOT" operation for a non-terminal node. The resultant of the "NOT" operation is output as bit pair 443a. At the next level and node in the sequence (moving from left to right and top to bottom) the bit pairs "11" and "01" are retrieved from the bit strings and are combined using the "NOT" operation for a non-terminal node. The output of the "NOT" operation is bit pair 443b (FIG. 9E).

At level 2 and node 0 only the bit pair "01" of bit string A (keyword 1) is present. Therefore this bit pair is copied into the resultant bit string as indicated at 443c. Likewise, at level 1 and node 1 (see FIGS. 3B-3D) the bit pair "01" of bit string A is the only bit pair present and is therefore copies into the bit string as indicated at 443d (FIG. 9E). At level 2, node 1 again there is a bit pair present from each bit string so the "01" bit pair of bit string A and the "01" bit pair for bit string B are combined using the "NOT" operation. A "11" bit pair is output as indicated at 443e.

At level 1 node 2 only the bit pair "01" of bit string A is present so that bit pair is copied into the resultant bit string as indicated at 443f. At level 1, node 3 the bit pairs "01" and "11" from both bit strings are retrieved. Since both bit pairs occur at level 1, the "NOT" operation for a terminal node is used to combine the bit pairs, resulting in the "00" bit pair output as indicated at 443g. Since the remaining bit pairs each belong to the second bit string retrieved (i.e., bit string B), at each remaining level and node the bit pairs are skipped and do not result in any further output for the resultant bit string.

Figure 9A:
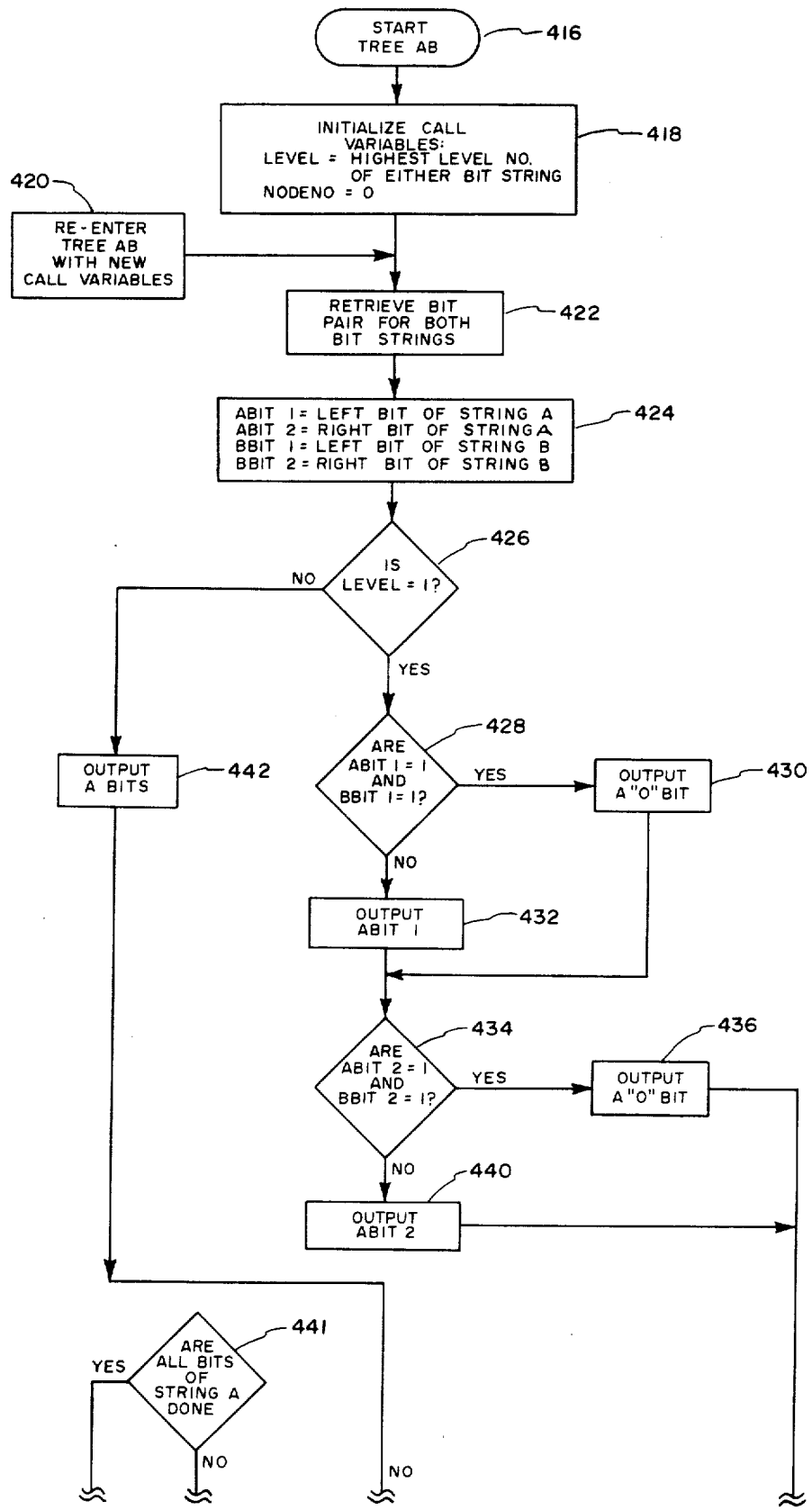
FIGS. 9A-9D are flowcharts illustrating one presently preferred embodiment of a method for performing a logical "NOT" operation in accordance with the system and method of the present invention.

A more detailed discussion of the above-described example applies using the flowcharts of FIGS. 9A-9D is illustrated in charts 444, 458 and 472 of FIGS. 9H-9J. As in the case when performing the "AND" and "OR" operations, when a pair of bit strings have been retrieved by CPU 12 and sent to processor 20, the subroutine for performing the "NOT" operation is retrieved from file 22e of ROM 22 and the subroutine is initialized as indicated at step 416 in FIG. 9A. Processor 20 next initializes the call variables, which consist of the variable "level" and the variable "NODENO". These call variables indicate the level and node in the hierarchal tree represented by the bit pairs.

As further indicated at step 418, the call variables are initialized by setting "level" equal to the highest level number represented in either bit string, and "NODENO" is initially set to 0. Thus, as indicated in chart 444 of FIG. 9H, for call number 1 the call variables are set at 4 and at 0 in the row corresponding to call number 1. The bit pairs for both bit strings represented at level 4, node 0 are then retrieved as indicated at step 422, and as shown in columns 452a and 452b of FIG. 9H.

Processor 20 next moves to step 424 and sets four flags corresponding to the left and right bit of each bit pair, as indicated. Processor 20 then checks at step 426 to determine whether it has reached a terminal node. During call number 1 "level" is 4, so processor 20 determines that it has not reached a non-terminal node and moves to step 442. Processor 20 outputs each of the bits for the "ABIT" flags as shown at 443a in chart 444 (FIG. 9H). Processor 20 then moves to step 270 of FIG. 9B.

Figure 9B:
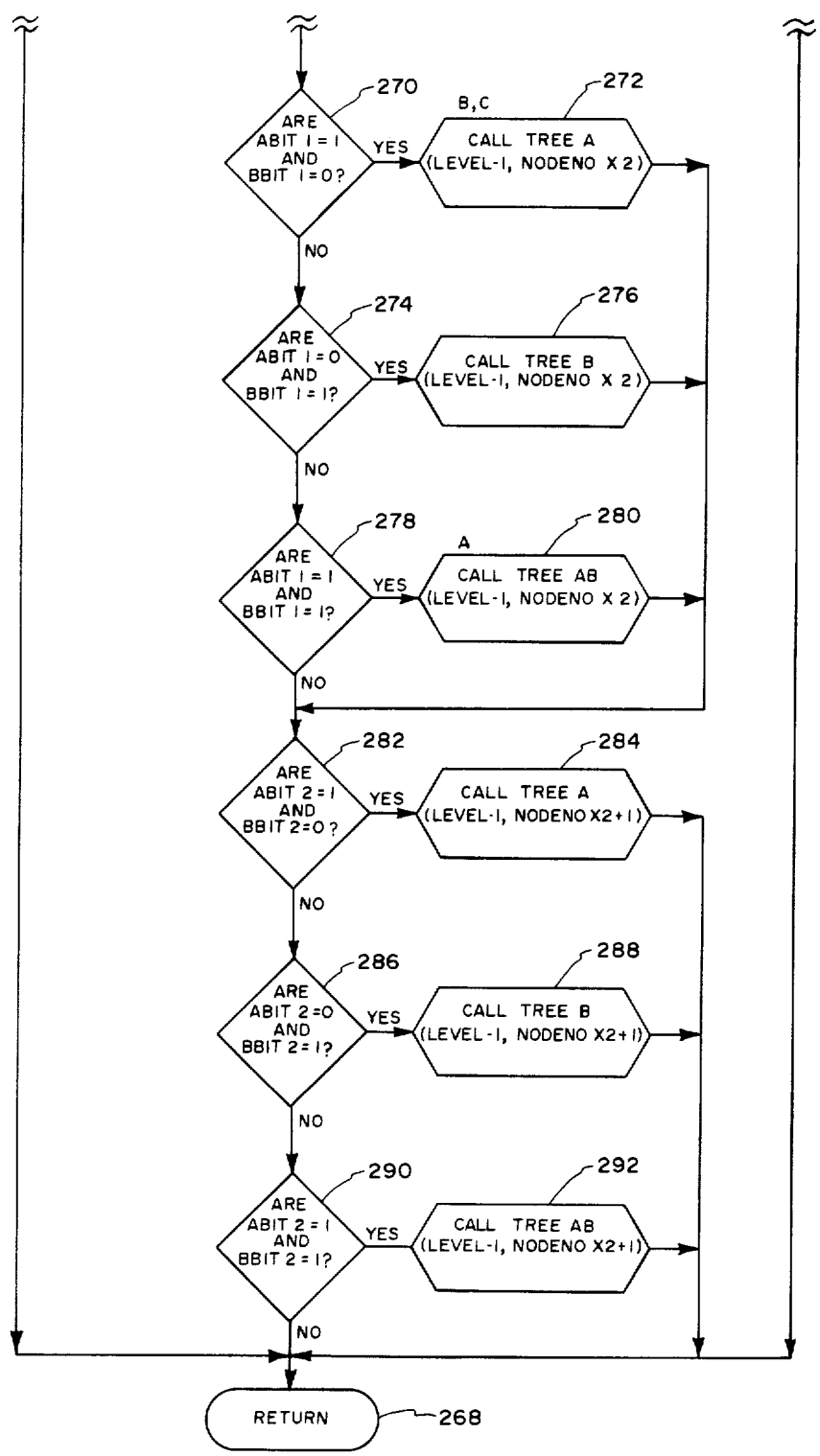
Figure 9C:
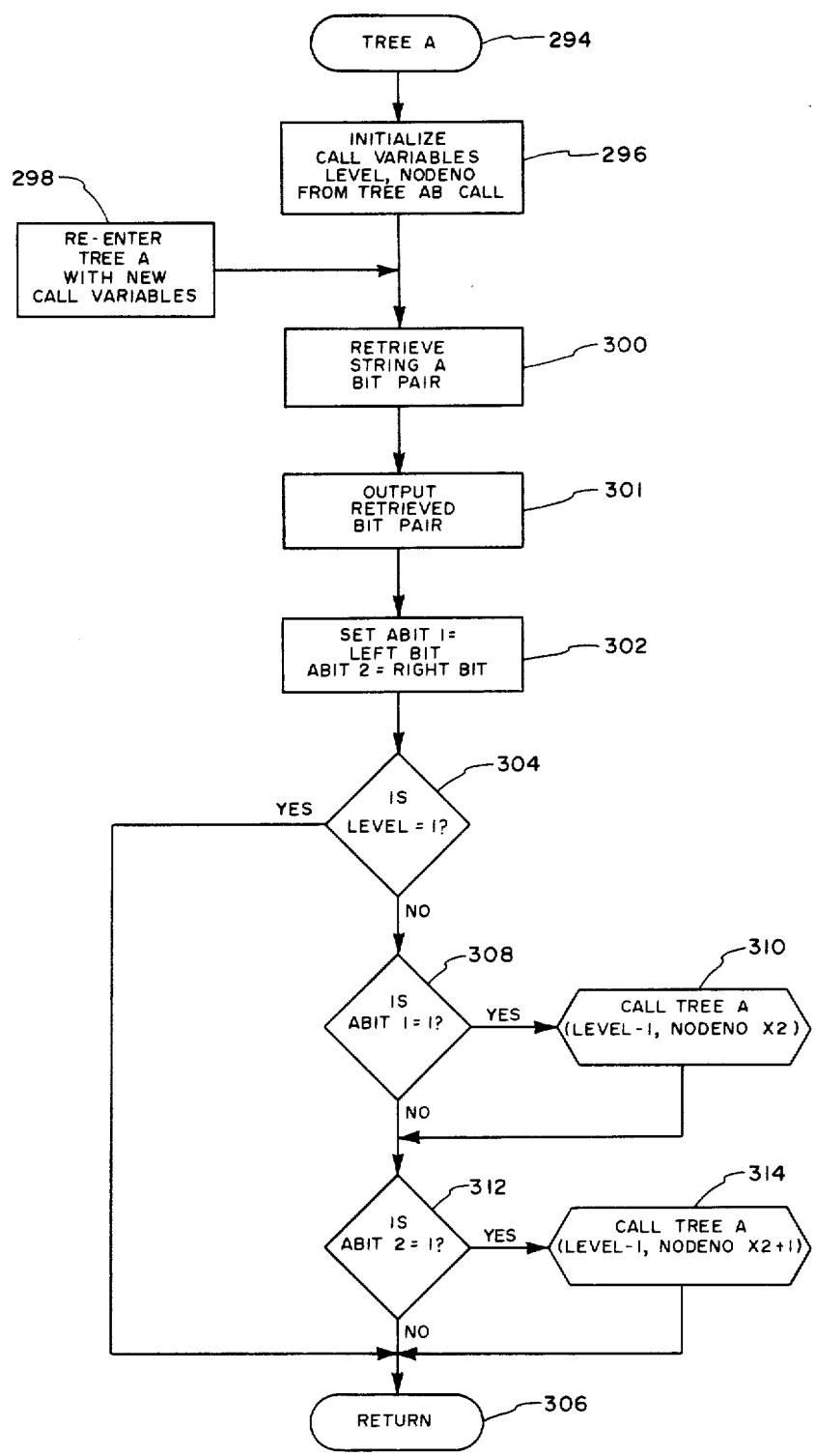
Figure 9D:
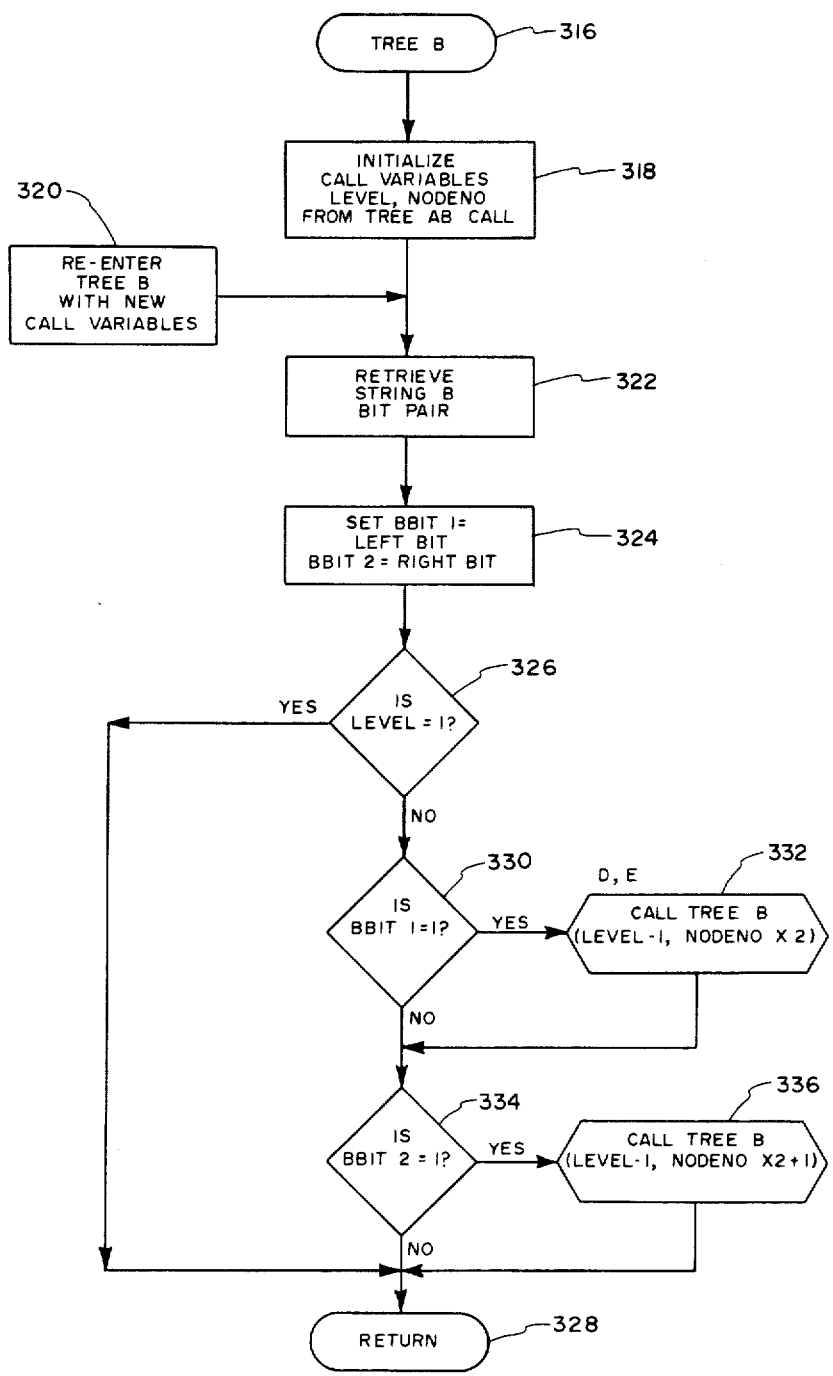

Steps 270-292 of FIG. 9B are the same as previously described in connection with FIGS. 7B and 8B. Thus processor 20 next uses the "ABIT" and "BBIT" flags to determine whether a bit pair from both bit strings is present at the next level and node in the sequence, moving from left to right and top to bottom as previously described. If bit pairs from both bit strings are present at the next level and node, the processor 20 re-enters the subroutine for TREE AB. Where only a bit pair for string A is present at the next level and node, the processor 20 calls the subroutine for TREE A (FIG. 9C), and if a bit pair from bit string B is the only bit pair present at the next level and node, the processor 20 calls the subroutine for TREE B (FIG. 9D).

During call number 1, processor 20 determines at steps 270, 274 and 278 that the "ABIT1" and "BBIT1" flags were both set to 1 and therefore moves to 80 where it sets a pending call A then decrements the "level" variable and resets NODENO. Processor 20 then re-enters the TREE AB subroutine at step 420 with the new call variables. Thus, as indicated in chart 444 of FIG. 9H, for call number 2 the "level" and "NODENO" variables are 3 and 0 respectively, and the bit pairs "11" and "01" represented at level 3 and node 0 are each retrieved as indicated at step 422.

The "ABIT" and "BBIT" flags are again set as indicated in step 424 and processor 20 then determines at step 426 that it has not yet reached level 1, so the A bits are again output at step 442, as shown at 443b in chart 444 (FIG. 9H). Processor 20 then moves to step 270 as before, where it determines that "ABIT1" was set to 1 and "BBIT1" was set to 0, therefore moving the processor to step 272.

At step 272 pending call B is recorded and the call variables are again reset as indicated. Processor 20 then calls the subroutine for TREE A in FIG. 9C. Thus, as shown in chart 458 of FIG. 9I, for call number 3 processor 20 initializes the TREE A subroutine at step 292 using the call variables determined at step 272. The bit pair for bit string A which is represented at level 2 and node 0 (in this example "01") is then retrieved at step 300 (FIG. 9C) and output at step 301. Thus, as indicated at 443c, the third bit pair of the resultant bit string is output during call number 3.

Processor 20 then moves to step 302 where it sets the flags for "ABIT1" and "ABIT2" and then moves to step 304 to determine whether it has reached level 1. Since during call number 3 the level is 2, processor 20 moves to step 308. Since the flag for "ABIT1" is 0, processor 20 moves to step 312 where it determines that the flag for "ABIT2" was set to 1 and then moves to step 314. At step 314 the call variables are reset as indicated and the TREE A subroutine is then re-entered at step 298 with the new call variables. Thus, as shown in chart 458, for call number 4 the bit pair "01" from bit string A representing level 1 and node 0 is retrieved.

After retrieving the bit pair at step 300, processor 20 again moves to step 301 and outputs the retrieved bit pair, as indicated at 443b in row 2 of the chart 458 (FIG. 9I). Processor 20 then resets the flags at step 302 and moves to step 304. Since level 1 has been reached, at step 304 processor 20 moves to step 306 where it is instructed to return. Processor 20 next checks RAM 24 to determine where the last pending call was recorded, and then returns to that pending call. Since pending call B was set during call number 2, processor 20 next moves to step 282 where it again tests the flags for "ABIT2" and "BBIT2" which were set during call number 2.

Processor 20 next moves through steps 282, 286 and 290 where it determines that the flag for "ABIT2" and "BBIT2" are both set to 1 and therefore moves to step 292. At step 292 processor 20 resets the call variables which were used during call number 2 by subtracting one from the call variable for "level" and by multiplying the call variable for "NODENO" by two and adding one. Thus, as indicated in chart 44 of FIG. 9H, for call number 5 processor 20 completes pending call B and re-enters the TREE AB subroutine at step 420.

Processor 20 next retrieves a bit pair from each bit string represented at level 2 and node 1 as indicated at call 5 in columns 454a and 452b of chart 444. After retrieving each bit pair at step 422, the "ABIT" and "BBIT" flags are set at step 424 and processor 20 then moves to step 426. Since for call number 5 the processor is at level 2, processor 20 next moves to step 442 and outputs the A bits as indicated at 443e in chart 444.

Processor 20 next moves to step 270 where it determines that the flag for "ABIT1" is 1 and the flag for "BBIT1" is 0, therefore causing processor 20 to move to step 272. At step 272 pending call C is recorded and the call variables are reset as indicated. Processor 20 then calls the subroutine for TREE A in FIG. 9C. As shown in chart 458 of FIG. 9I, for call number 6 processor 20 enters the TREE A subroutine and sets the call variables at step 296, and then retrieves the bit pair "01" from bit string A for level 1 and node 2. After retrieving the bit pair at step 300, processor 20 outputs the retrieved bit pair at step 301 as indicated at 443f in chart 458. Processor 20 then sets the flags in step 302 and determines at step 304 that it has reaches level 1, therefore causing the processor 20 to move to step 306, which is a return instruction. Processor 20 then checks RAM 24 to find the last pending call and returns to step 272 to complete pending call C.

From 272 (FIG. 9B) processor 20 moves to step 282 where it checks the flags for "ABIT2" and "BBIT2" that were set during call number 5. Thus processor 20 moves through steps 282 and 286 until it reaches step 290 where it determines that the flags were both set to 1 and then moves to step 292. At step 292 the call variables are reset as indicated and processor 20 re-enters the TREE AB routine at step 420 with the new call variables for call number 7.

As shown in chart 444, the pending call C is completed at call number 7, which uses 1 and 3 as the values for "level" and "NODENO." The bit pairs represented at level 1 and node 3 for both bit strings are then retrieved as indicated in columns 452a and 452b of chart 444. After retrieving the bit pairs at step 422, the processor 20 resets the flags at step 424 and then moves to step 426. At step 426 processor 20 determines that it has reached level 1, thereby signifying that a terminal node has been reached at which a bit pair for both bit strings is present. Therefore processor 20 moves to step 428. Since "ABIT1" was set to 0 and "BBIT1" was set to 1, processor 20 moves to step 432 and outputs "ABIT1" (in this case a 0) as the first bit of the output bit pair. Processor 20 then moves to step 434 where it determines that the flags for "ABIT2" and "BBIT2" were both set to 1 thereby causing the processor to move to step 436 where the second bit is output as a 0 bit. Thus as indicated at 443g in chart 444, the last bit pair output for the resultant bit string is a "00."Processor 20 then moves to step 268 where it returns to complete pending call A at step 280. Processor 20 thus moves next to step 282 and uses the "ABIT2" and "BBIT2" flags that were set during call number 1, and determines at step 286 that the next call will be as indicated in step 288, causing processor 20 to enter the TREE B subroutine.

The remaining calls as indicated in chart 472 and the steps illustrated in the flowchart of FIG. 9D for TREE B are the same as those previously described in connection with chart 363 and FIG. 7D. Thus as indicated in chart 472, for each of the remaining calls each bit pair for bit string B is retrieved and then skipped so that no further output for the resultant bit string is generated.

In FIG. 9A it should be noted that the method may be simplified by including step 441 after step 442. In step 441 the processor 20 checks to determine whether all bits of bit string A have been completed. If so all remaining bits of bit string B will be skipped and therefore there is no need to process the remaining bits of bit string B further, so processor 20 can then move directly to the end of the subroutine.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer system comprising a CPU, an input-/output terminal connected to said CPU, a main CPU memory and a secondary storage means containing a data base, a method of indexing individual records of said data base, and rapidly searching and retrieving selected records corresponding to one or more keywords input to said CPU, said method comprising the steps of:

said CPU forming a vector for each said keyword, each said vector comprising one or more array elements which together comprise a numerically sorted list of all record numbers where the keyword for that vector is found;

said CPU transforming each said vector so as to form a data base index comprising a bit string for each said vector, said step of transforming each said vector comprising the steps of:

(a) transforming said numerically sorted list of record numbers into a binary matrix wherein each row of said matrix corresponds to a binary representation of one of said vector array elements, and wherein each column of said matrix corresponds to a level of said hierarchal tree;

(b) determining the first column of said matrix where both ones and zeros are present;

(c) grouping said ones and zeros to identify the number of bits in each such group;

(d) determining whether the first and last bit in each said group are both ones, are zero and one or both zeros, and outputting a "01," "11" or "10," respectively, so as to form one bit pair of said bit string;

(e) splitting the next column of said matrix into groups of bits based on the number of bits in each group determined in step (c);

(f) repeating steps (c) and (d) for each said group of said next column; and (g) repeating steps (b) through (f) until each column of said matrix has been done.

said CPU storing said data base index in said secondary storage means;

inputting at said input/output terminal at least one keyword;

said CPU searching said data base index and retrieving the bit string for said keyword input at said terminal; said CPU transforming said retrieving bit string back into the vector for said input keyword; and said CPU identifying at said input/output terminal the records of said data base identified by said list of record numbers associated with the vector for said input keyword.

2. A method as defined in claim 1 wherein the size of said data base is defined by a number of bytes and wherein said keywords comprise substantially all words contained in each record of said data base.

3. A method as defined in claim 2 wherein said data base index is not larger than approximately one-fifth the number of bytes contained in said data base.

4. A method as defined in claim 2 wherein said step of transforming each said vector comprises transforming a binary representation of said vector to a bit string in which the number of bits is reduced, on the average, to not more than approximately one-fifth the number of bits contained in said binary representation of said vector.

5. A method as defined in claim 1 wherein each said bit string comprises a header identifying one of said keywords, the number of bit pairs in the bit string, the number of array elements in the vector from which said bit string was transformed, and a level in said hierarchal tree at which said bit string begins.

6. A method as defined in claim 1 wherein each said bit string comprises a plurality of bit pairs and wherein each said bit pair represents a level and a node number of said hierarchal tree.

7. A method as defined in claim 6 wherein said step of transforming said retrieved bit string back into the vector for said keyword comprises the steps of:

beginning from left to right and front top to bottom, retrieving in sequence each bit pair for each level and node of said hierarchal tree represented by said bit string;

determining whether each retrieved bit pair represents a terminal node of said tree; and for each retrieved bit pair representing a terminal node of said tree, outputting an array element consisting of a record number derived from the node number represented by said bit pair for said terminal node.

8. A method as defined in claim 1 wherein said computer system further comprises a bit processor and a memory for programming said bit processor.

9. A method as defined in claim 8 wherein said step of transforming each said vector comprises the steps of said CPU calling said bit processor and said bit processor thereafter receiving from said CPU each said vector and transforming each said vector and then returning to said CPU a bit string formed from said vector.

10. A method as defined in claim 8 wherein said step of transforming said retrieved bit string back into the vector for said keyword comprises the steps of said CPU calling said bit processor and said bit processor thereof thereafter receiving from said CPU said retrieved bit string and transforming said retrieved bit string back into said vector and then returning said vector to said CPU.

11. A method as defined in claim 1 further comprising the steps of:

inputting at least two keywords at said input/output terminal;

inputting at said input/output terminal a command instructing said CPU to logically join said keywords in a selected way;

said CPU searching said data base index and retrieving the bit string for each said keyword to be joined;

said CPU merging the bit strings retrieved for said keywords to form a resultant bit string for the joined keywords;

said CPU transforming said resultant bit string into a vector which identifies by record number each record of said data base containing the joined keywords; and said CPU identifying at said input/output terminal the records identified by the vector for said joined keywords.

12. A method as defined in claim 11 wherein each said bit string comprises a plurality of bit pairs and wherein each said bit pair represents a level and a node number of said hierarchal tree.

13. A method as defined in claim 12 wherein said command comprises a logical "AND" instruction and wherein said step of merging said retrieved bit string comprises the steps of:

beginning from left to right and from top to bottom, retrieving in sequence each bit pair of said retrieved bit string at each level and each node of said hierarchal tree represented by said retrieved bit strings;

determining each level and node at which a bit pair for each retrieved bit string is present and performing a logical "AND" operation on the corresponding bits of each bit pair and each such level and outputting the results of said "AND" operation as a bit pair of said resultant bit string; and skipping each bit pair at each level where a bit pair for only one retrieved bit string is present.

14. A method as defined in claim 12 wherein said command comprises a logical "OR" instruction and wherein said step of merging said retrieved bit strings comprises the steps of:

beginning from left to right and from top to bottom, retrieving in sequence each bit pair of said retrieved bit strings at each level and each node of said hierarchal tree represented by said retrieved bit strings;

determining each level and node at which a bit pair for each retrieved bit string is present and performing a logical "OR" operation on the corresponding bits of each bit pair at each such level, and outputting the result of said "OR" operation as a bit pair of said resultant bit string; and reproducing each bit pair at each level and node where a bit pair for only one retrieved bit string is present, said output bit pairs and said reproduced bit pairs together forming said resultant bit string.

15. A method as defined in claim 12 wherein said command comprises a logical "NOT" instruction for a first keyword "NOT" a second keyword, and wherein said step of merging said retrieved bit strings comprises the steps of:
- beginning from left to right and from top to bottom, retrieving in sequence each bit pair of said retrieved bit strings at each level and each node of said hierarchal tree represented by said retrieved bit strings;
- determining each level and node where only a bit pair of the retrieved bit string for said first keyword is present, and reproducing the bit pair of said retrieved bit string for said first keyword at each such level and node; and
- determining each level and node where a bit pair for the retrieved bit strings of both said keywords is present, and if said node is non-terminal reproducing the bit pair for keyword one, and if said node is terminal outputting a bit pair in which a "1" bit is present only where a bit for said first keyword is "1" and a corresponding bit for said second keyword is "0."

16. A method as defined in claim 11 wherein said computer system further comprises a bit processor and a memory for programming said bit processor.

17. A method as defined in claim 16 wherein said step of merging said bit strings comprises the steps of said CPU calling said bit processor and sending said retrieved bit strings to said bit processor, and said bit processor thereafter merging said bit strings to from said resultant bit string and returning said resultant bit string to said CPU.

18. A method as defined in claim 17 wherein said step of transforming said resultant bit string comprises the steps of said CPU calling said bit processor and sending said resultant bit string to said bit processor, and said bit processor thereafter transforming said resultant bit string into said vector for said joined keywords and returning said vector to said CPU.

19. A method as defined in claim 1 further comprising the steps of:
- adding one or more new records to said data base and identifying all keywords contained by said new records;
- said CPU forming a vector for each keyword of said new records and transforming each vector into a bit string for each keyword of the new records;
- said CPU searching said data base index and retrieving from said index each keyword corresponding to a keyword contained in said new records, and then merging the bit strings for said corresponding keywords to form an updated bit string for that keyword; and
- said CPU adding to said index the bit string for each keyword of said new records for which no corresponding keyword was found in said index.

20. A method as defined in claim 19 wherein said step of merging said bit strings comprises performing a logical "OR" operation on each pair of bit strings to be merged.

21. A method as defined in claim 1 further comprising the steps of:
- deleting one or more records from said data base and identifying all keywords contained by said deleted records;
- said CPU forming a vector for each keyword of said deleted records and transforming each vector into a bit string for each keyword of the deleted records; and
- said CPU searching said data base index and retrieving from said index each keyword corresponding to a keyword contained in said deleted records, and then merging the bit strings for said corresponding keywords to form an updated bit string for each such keyword.

22. A method as defined in claim 21 wherein said step of merging said bit strings comprises performing a logical "NOT" operation on each pair of bit strings to be merged.

23. A method of indexing, searching and retrieving individual records contained in a computer data base, said method comprising the steps of:
- inputting to a computer a plurality of records to be stored as said data base, and assigning a record number to each said record, each said record number corresponding to a terminal node of a hierarchal tree;
- identifying a plurality of keywords contained in said records and listing for each keyword those record numbers where that keyword is found;
- forming a vector for each said keyword, each said vector containing one or more array elements which together comprise a numerically sorted list of all said record numbers which identify the records where the keyword for that vector is found;
- transforming each said vector by converting each said array element into a corresponding binary representation and thereafter deriving from said binary representations a bit string comprising a plurality of bit pairs, each bit pair representing a level and a node of a hierarchal tree, and each said bit string being identified by the keyword for the vector from which said bit string was formed;
- storing each said keyword and its associated bit string so as to form an index to said data base;
- inputting to said computer at least two keywords and command instructing said computer to logically join said keywords in a specified manner;
- searching said index and retrieving therefrom the bit strings identified by said keywords;
- merging said retrieved bit strings to form a resultant bit string for said logically joined keywords, said resultant bit string comprising a plurality of bit pairs, each bit pair representing a level and a node of said hierarchal tree;
- transforming said resultant bit string into a vector containing one or more array elements which together comprise a numerically sorted list of all record numbers for those records in which said logically joined keywords appear; and
- outputting from said computer an identification of all said records in which said logically joined keywords apear.

24. A method as defined in claim 23 wherein said records each comprise a plurality of words and wherein said keywords comprise substantially all words contained in each said record of said data base.

25. A method as defined in claim 24 wherein the size of said data base is defined by a number of bytes and wherein said index to said data base is not larger than approximately one-fifth the number of bytes contained in said data base.

26. A method as defined in claim 25 wherein said step of transforming each said vector into a bit string comprises arranging said binary representations in the form of a corresponding binary matrix and thereafter transforming said binary matrix into said bit string, the size of said binary matrix being defined in terms of a number of bits and the number of bits contained ins aid bit string being reduced by said transformation, on the average, to not more than approximately one-fifth the number of bits contained in said binary matrix.

27. A method as defined in claim 23 wherein said step of transforming each said vector into a bit string comprises the steps of:
(a) transforming said numerically sorted list of record numbers of said vector into a binary matrix wherein each row of said matrix corresponds to a binary representation of one of said vector array elements of said numerically sorted list, and wherein each column of said binary matrix corresponds to a level of said hierarchal tree;
(b) determining the first column of said matrix where both ones and zeros are present;
(c) grouping said ones and zeros to identify the number of bits in each such group;
(d) determining whether the first and last bit in each said group are both ones, are zero and one or both zeros, and outputting a "01," "11" or "10" respectively, so as to form one bit pair of said bit string;
(e) splitting the next column of said matrix into groups of bits based on the number of bits in each group determined in step (c);
(f) repeating steps (c) and (d) for each said group of said next column; and
(g) repeating steps (b) through (f) until each column of said matrix has been done.

28. A method as defined in claim 23 wherein said step of transforming said resultant but string into a vector containing a numerically sorted list of all record numbers which identify the records in which said logically joined keywords appear comprises the steps of:
beginning from left to right and from top to bottom, retrieving in sequence of each bit pair for each level and node of said hierarchal tree represented by said resultant bit string;
determining whether each retrieved bit pair represents a terminal node of said tree; and
for each retrieved bit pair representing a terminal node of said tree, outputting an array element derived from the node number represented by said bit pair for said terminal node.

29. A method as defined in claim 23 wherein said command instructing said computer to logically join said keywords comprises a logical "AND" instruction and wherein said step of merging said retrieved bit strings to form said resultant bit string comprises the steps of:
beginning from left to right and from top to bottom, retrieving in sequence each bit pair of said retrieved bit strings at each level and at each node of said hierarchal tree represented by said retrieved bit strings;
determining each level and node at which a bit pair for each retrieved bit string is present and performing a logical "AND" operation on the corresponding bits of each bit pair at each such level and outputting the result of such logical "AND" operation as a new bit pair at each such level; and
skipping each bit pair at each level where a bit pair for only one retrieved bit string is present.

30. A method as defined in claim 23 wherein said command instructing said computer to logically join said keywords comprises a logical "OR" instruction and wherein said step of merging said retrieved bit strings comprises the steps of:
beginning from left to right and from top to bottom, retrieving in sequence each bit pair of said retrieved bit strings at each level and each node of said hierarchal tree represented by said retrieved bit strings;
determining each level and node at which a bit pair for each retrieved bit string is present and performing a logical "OR" operation on the corresponding bits of each bit pair at each such level, and outputting the result of said logical "OR" operation as a new bit pair at each such level; and
reproducing each bit pair at each level and node where a bit pair for only one retrieved bit string is present, said new bit pairs and said reproduced bit pairs together forming said resultant bit string.

31. A method as defined in claim 30 further comprising the steps of:
inputting to said computer a plurality of new records to be added to said data base and identifying all keywords contained in said new records;
forming a vector for each keyword contained in said new records;
transforming each vector for the keywords of said new records into a bit string;
searching said index to said data base and retrieving from said index all keywords corresponding to the keywords contained in said new records;
performing said logical "OR" operation so as to merge the bit string for each keyword contained in said new records with said corresponding keyword retrieved from said index so as form a new bit string for that keyword; and
storing said new bit string in said index to said data base.

32. A method as defined in claim 23 wherein said command instructing said computer to logically join said keywords comprises a logical "NOT" instruction for selecting all records containing a first keyword and "NOT" a second keyword, and wherein said step of merging said retrieved bit strings comprises the steps of:
beginning from left to right and from top to bottom, retrieving in sequence each bit pair of said retrieved bit strings at each level and each node of said hierarchal tree represented by said retrieved bit strings;
determining each level and each node where only a bit pair of the retrieved bit string for said first keyword is present, and reproducing the bit pair of said retrieved bit string for said first keyword; and
determining each level and each node where a bit pair for the retrieved bit strings of both said keywords is present, and if said node is non-terminal reproducing the bit pair for keyword one, and if said node is terminal outputting a bit pair in which a "1" bit is present only where a bit for said first keyword is "1" and a corresponding bit for said second keyword is "0."

33. A method as defined in claim 32 further comprising the steps of:
deleting one or more records from said data base and identifying all keywords contained by said deleted records;
forming a vector for each keyword of said deleted records and transforming each said vector into a bit string identifying each keyword of said deleted records;

searching said index and retrieving from said index each keyword corresponding to a keyword contained in said deleted records; and performing said logical "NOT" operation so as to merge the bit strings for said corresponding keyword to form an updated bit string for each such keyword and thereafter storing said updated bit string in said index.

34. A computer system for indexing and rapidly searching and retrieving individual records contained in a data base, said system comprising:

a main CPU memory for controlling a CPU;

a secondary storage means comprising:
- (a) a plurality of individual data base records each containing one or more keywords from which a vector for each said keyword is formed, each said vector comprising one or more array elements which together comprise a numerically sorted list of all record numbers which identify the terminal nodes of a hierarchal tree where the records containing the keyword for that vector are found; and
- (b) an index to said data base records comprising a plurality of randomly linked bit strings derived from said vectors, each said bit string being identified by one of said keywords and comprising a plurality of bit pairs, each said bit pair representing a level and a node of said hierarchal tree;

an input/output terminal for entering one or more keywords to be logically joined; and a CPU adapted to
- (a) receive said entered keywords,
- (b) locate corresponding keywords in said index,
- (c) retrieve the bit string for each keyword found in said index,
- (d) combine the retrieved bit strings to form a new bit string,
- (e) transform the new bit string into a vector, and
- (f) output an identification of all records containing the logically joined keywords input at said terminal.

35. A system as defined in claim 34 wherein said individual records comprise a plurality of words and wherein said keywords comprise substantially all words contained in each said individual record.

36. A system as defined in claim 35 wherein the portion of said secondary storage means in which said individual records are stored is defined in terms of the number of bytes required to store said individual records, and wherein said bit string index is not larger than approximately onefifth the number of bytes required to store said individual records.

37. A system as defined in claim 34 further comprising a bit processor connected to said CPU and a read only memory connected to said bit processor, and wherein said bit processor is adapted to combine said bit strings retrieved by said CPU to form said new bit string, and is adapted to transform said new bit string into said vector and to return said vector to said CPU for output of said identification of said records containing the logically joined keywords input of said terminal.

38. In a computer system comprising a CPU, an input/output terminal connected to said CPU, a main CPU memory and a secondary storage means containing a data base, a method of indexing individual records of said data base, and rapidly searching and retrieving selected records corresponding to one or more keywords input to said CPU, said method comprising the steps of:

inputting to said CPU a plurality of records to be stored as said data base, and assigning a record number to each said record, each said record number corresponding to a terminal node of a hierarchal tree;

identifying a plurality of keywords contained in said records;

said CPU forming a vector for each said keyword, each said vector containing one or more array elements which together comprise a numerically sorted list of all said record numbers which identify the records where the keyword for that vector is found;

said CPU transforming each said vector by converting each said array element into a corresponding binary representation and thereafter deriving from said binary representations a bit string comprising a plurality of bit pairs, each bit pair representing a level and a node of said hierarchal tree, each said bit string being identified by the keyword for the vector from which said bit string was formed, and said bit strings being randomly linkned so as to form said hierarchal tree;

said CPU storing said data base index in said secondary storage means in the form of said randomly linked bit strings which form said hierarchal tree;

inputting at said input/output terminal at least one keyword;

said CPU searching said data base index and retrieving the bit string for said keyword input at said terminal;

said CPU transforming said retrieved bit string back into the vector for said keyword; and said CPU identifying at said input/output terminal the records of said data base associated with the vector for said keyword.

* * * * *

UNITED STATES PATENT AND TRADEMARK OFFICE
CERTIFICATE OF CORRECTION

PATENT NO. : 4,817,036

DATED : March 28, 1989

INVENTOR(S) : Ronald P. Millett

It is certified that error appears in the above-identified patent and that said Letters Patent is hereby corrected as shown below:

Column 1, line 55, "On approach" should be --One approach--
Column 5, line 66, "referened" should be --referenced--
Column 6, line 15, "Reference is first made to FIG. 2" should be --Reference is first made to FIG. 1--
Column 7, line 21, "retieve" should be --retrieve--
Column 8, line 24, "as indicated at '2832'" should be --as indicated at '28-32'--
Column 9, line 38, "retireved" should be --retrieved--
Column 10, line 61, "at th ledt" should be --at the left--
Column 12, line 12, "keyowrd" should be --keyword--
Column 13, line 26, "toONEPT" should be --to ONEPT--
Column 16, lines 22-23, " "11" of a "1C" " should be --"11" or a "10"--
Column 17, line 22, "cals" should be --calls--
Column 18, line 32, "againa" should be --again a--
Column 18, line 39, "the" should be --The-- (2nd occurrence)
Column 22, line 19, "(FIG. 7H) should be --(FIG. 7H).--
Column 23, line 53, delete "is"
Column 24, line 13, "andmethod" should be --and method--
Column 29, line 14, "after "terminal;" the following phrase should begin a new paragraph
Column 30, line 5, "thereof thereafter" should be --thereafter--
Column 31, line 31, "to from" should be --to form--
Column 33, line 4, "ins aid" should be --in said--
Column 35, line 53, "onefifth" should be --one-fifth--

UNITED STATES PATENT AND TRADEMARK OFFICE
CERTIFICATE OF CORRECTION

PATENT NO.  : 4,817,036
DATED       : March 28, 1989
INVENTOR(S) : Ronald P. Millett It is certified that error appears in the above-identified patent and that said Letters Patent is hereby corrected as shown below:

Column 36, line 39, "linkned" should be --linked--

Signed and Sealed this

Twenty-ninth Day of May, 1990

Attest:

HARRY F. MANBECK, JR.

*Attesting Officer*          *Commissioner of Patents and Trademarks*